United States Patent
Guo et al.

(10) Patent No.: US 9,445,333 B2
(45) Date of Patent: Sep. 13, 2016

(54) METHOD AND DEVICE FOR SWITCHING OF MULTI-CARRIER

(71) Applicant: Huawei Technologies Co., Ltd., Shenzhen, Guangdong (CN)

(72) Inventors: Xuanyu Guo, Shenzhen (CN); Yanyan Chen, Shenzhen (CN); Bingzhao Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 309 days.

(21) Appl. No.: 13/866,416

(22) Filed: Apr. 19, 2013

(65) Prior Publication Data

US 2013/0230022 A1 Sep. 5, 2013

Related U.S. Application Data

(63) Continuation of application No. PCT/CN2011/080287, filed on Sep. 28, 2011.

(30) Foreign Application Priority Data

Oct. 21, 2010 (CN) .......................... 2010 1 0526860

(51) Int. Cl.
*H04W 4/00* (2009.01)
*H04W 36/18* (2009.01)
*H04W 36/00* (2009.01)

(52) U.S. Cl.
CPC ......... *H04W 36/18* (2013.01); *H04W 36/0066* (2013.01)

(58) Field of Classification Search
CPC ...................................................... H04L 5/001
See application file for complete search history.

(56) References Cited

U.S. PATENT DOCUMENTS

| 6,889,050 B1 | 5/2005 | Willars et al. |
| 2005/0026616 A1* | 2/2005 | Cavalli et al. ................ 455/436 |

(Continued)

FOREIGN PATENT DOCUMENTS

| CN | 1478364 A | 2/2004 |
| CN | 1909723 A | 2/2007 |

(Continued)

OTHER PUBLICATIONS

"3GPP TSG-RAN2 Meeting #68—Handover Execution Using Multiple Carriers," Agenda Item 7.3.7, Document R2-097059, 3$^{rd}$ Generation Partnership Project, Valbonne, France (Nov. 2009).

(Continued)

*Primary Examiner* — Edan Orgad
*Assistant Examiner* — Rebecca Song
(74) *Attorney, Agent, or Firm* — Leydig, Voit & Mayer, Ltd.

(57) ABSTRACT

A method for switching of multi-carrier and device are provided. The method comprises: receiving a message sent from a source RAN node corresponding to a first link and comprising information of a second link; according to the information of the second link, establishing a connection between a target RAN node corresponding to the first link and an RAN node corresponding to the second link, so as to perform data transmission. The first link is a link in a first Radio Access Technology (RAT) network, and the second link is a link in a second RAT network. Embodiments of the present invention can ensure the continuity of the throughput of data transmission during switching under aggregation of multiple RAT carriers.

33 Claims, 19 Drawing Sheets

(56) References Cited

U.S. PATENT DOCUMENTS

| | | | |
|---|---|---|---|
| 2005/0185619 A1* | 8/2005 | Niemela | H04W 36/30 370/331 |
| 2005/0288027 A1 | 12/2005 | Cho et al. | |
| 2007/0213059 A1 | 9/2007 | Shaheen | |
| 2010/0120431 A1 | 5/2010 | Hwang et al. | |
| 2011/0134831 A1* | 6/2011 | Pirskanen | 370/328 |
| 2011/0305220 A1* | 12/2011 | Lindoff et al. | 370/331 |
| 2012/0120821 A1* | 5/2012 | Kazmi | H04W 56/0005 370/252 |
| 2012/0314675 A1* | 12/2012 | Vujcic | 370/329 |

FOREIGN PATENT DOCUMENTS

| | | |
|---|---|---|
| CN | 1969477 A | 5/2007 |
| CN | 101401470 A | 4/2009 |
| CN | 101742584 A | 6/2010 |
| CN | 101860931 A | 10/2010 |
| EP | 2583527 A1 | 4/2013 |
| WO | WO 2010019679 A2 | 2/2010 |
| WO | 2011159215 A1 | 12/2011 |

OTHER PUBLICATIONS

"3GPP TSG-RAN WG2 #69—Mobility and Carrier Aggregation Signaling," Agenda Item 7.1.10, Document R2-101561, $3^{rd}$ Generation Partnership Project, Valbonne, France (Feb. 2010).

"3GPP TSG-RAN WG2#69bis—Carrier Aggregation and Handover," Agenda Item 7.1.1.10, Document R2-102380, $3^{rd}$ Generation Partnership Project, Valbonne, France (Apr. 2010).

"3GPP TSG-RAN WG1 Meeting #64—Aggregation HSDPA and LTE Carriers," Agenda Item 6.3.2, Document R1-111060, $3^{rd}$ Generation Partnership Project, Valbonne, France (Feb. 2011).

"3GPP TSG RAN WG1 #64—Migration Scenarios and Possible Aggregation Between HSPA and LTE," Agenda Item 6.3.2, Document R1-111126, $3^{rd}$ Generation Partnership Project, Valbonne, France (Feb. 2011).

"3GPP TSG-RAN WG4 Meeting #58—Handover Requirements for Carrier Aggregation," Agenda Item 6.20.2, Document R4-110903, $3^{rd}$ Generation Partnership Project, Valbonne, France (Feb. 2011).

Written Opinion of the International Searching Authority in corresponding PCT Patent Application No. PCT/CN2011/080287 (Jan. 19, 2012).

International Search Report in corresponding PCT Patent Application No. PCT/CN2011/080287 (Jan. 19, 2012).

"$3^{rd}$ Generation Partnership Project; Technical Specification Group Radio Access Network; UTRAN Iu Interface Radio Access Network Application Part (RANAP) signaling (Release 9)," 3GPP TS 25.413, Sep. 2010, V9.4.0, 3GPP, Valbonne, France.

"$3^{rd}$ Generation Partnership Project; Technical Specification Group Radio Access Network; Evolved Universal Terrestrial Radio Access Network (E-UTRAN); S1 Application Protocol (S1AP) (Release 9)," 3GPP TS 36.413, Sep. 2010, V9.4.0, 3GPP, Valbonne, France.

* cited by examiner

METHOD AND DEVICE FOR SWITCHING OF MULTI-CARRIER

CROSS-REFERENCE TO RELATED APPLICATIONS

This application is a continuation of International Patent Application No. PCT/CN2011/080287, filed on Sep. 28, 2011, which claims priority to Chinese Patent Application No. 201010526860.0, filed on Oct. 21, 2010, both of which are hereby incorporated by reference in their entireties.

TECHNICAL FIELD

The present invention relates to mobile communication technology, and more specifically, to a method for switching of multi-carrier and device.

BACKGROUND

In all of Universal Mobile Telecommunications System (UMTS), Long Term Evolution (LTE) system, Code Division Multiple Access (CDMA) 2000, multi-carrier-frequency aggregation technology within the same Radio Access Technology (RAT) is introduced. The multi-carrier-frequency aggregation technology means that multi-carrier-frequency resources may be used to transmit the same user's data, here referred to as intra-system multi-carrier aggregation technology, to improve the user's peak rate. At present, multi-carrier aggregation technology within a single RAT has been mature. With the increase in the number of carrier aggregation, the service peak rate of a User Equipment (UE) will come to another bottle neck. Considering that networks of multiple modes (i.e. multiple RATs) will simultaneously coexist for a long time in present wireless communication networks, e.g. all of UMTS, Global System for Mobile communication (GSM), CDMA 2000 and LTE networks will coexist for a long time, a multimode terminal has been applied very widely. In order to further improve the peak rate, it is possible to make the UE operate in networks of two modes simultaneously. For example, the UE operates in UTMS and LTE systems simultaneously, or the UE operates in LTE and GSM EDGE Radio Access Network (GERAN) systems simultaneously, as well as between other systems, etc.

When the UE operates in networks of two modes or more modes simultaneously, a node that aggregates/divides data of the two or more networks is referred to as a data aggregation/division node. The data aggregation/division node may be used as a carrier aggregation control node or an anchor point which is used for performing carrier data division/aggregation control. A link corresponding to an anchor point is a primary RAT link, and a link corresponding to a non-anchor point is an auxiliary RAT link. For example, when the UE operates in UTMS and LTE systems simultaneously, link control nodes of UTMS and LTE systems are a Radio Network Controller (RNC) and an evolved NodeB (eNB) respectively. If the RNC of the UMTS system is an anchor point, the primary RAT link is a UMTS link and the auxiliary RAT link is an LTE link. Conversely, if the eNB of the LTE system is an anchor point, the primary RAT link is an LTE link and the auxiliary RAT link is a UMTS link.

In the prior art, when the UE is switched under aggregation of multiple RAT carriers, if only a source node and a target node are involved according to the switching scheme of a single RAT link, the continuity of the throughput of data transmission may not be ensured.

SUMMARY

According to various aspects of the present invention, there is provided a method for switching of multi-carrier and device, achieve switching under aggregation of multiple RAT carriers and ensure the continuity of the throughput of data transmission.

According to one aspect of the present invention, there is provided a method for switching of multi-carrier, comprising: receiving, by a target RAN node corresponding to a first link, a message sent from a source RAN node corresponding to the first link and comprising information of a second link; establishing, by the target RAN node corresponding to the first link, a connection with an RAN node corresponding to the second link according to the information of the second link, so as to perform data transmission; wherein the first link is a link in a first RAT network, and the second link is a link in a second RAT network.

According to another aspect of the present invention, there is provided a method for switching of multi-carrier, an RAN node corresponding to a second link being an anchor point for performing carrier data division/aggregation control, an RAN node corresponding to a first link being an RAN node of an auxiliary link, the method comprising: determining, by the anchor point for performing carrier data division/aggregation control corresponding to the second link, an RAN node of a target auxiliary link corresponding to the first link; and transmitting, by the anchor point, information of the RAN node of the target auxiliary link to an RAN node of a source auxiliary link corresponding to the first link in order to establish a connection with the RAN of the target auxiliary link through the RAN node of the source auxiliary link.

According to another aspect of the present invention, there is provided a method for switching of multi-carrier, comprising: determining, by a source RAN node of a first link, an RAN node that can continue using aggregation of multiple RAT carriers as a target RAN node of the first link; and transmitting, by the source RAN node of the first link, a message carrying information of a second link to the target RAN node of the first link, so that data transmission is performed after a connection between the target RAN node corresponding to the first link and an RAN node corresponding to the second link is established.

According to another aspect of the present invention, there is provided a multi-carrier switching device, comprising: a receiving module configured to receive a message sent from a source RAN node corresponding to the first link and comprising information of a second link; an establishing module configured to establish a connection between the target RAN node corresponding to the first link and an RAN node corresponding to the second link according to the information of the second link, so as to perform data transmission; wherein the first link is a link in a first RAT network, and the second link is a link in a second RAT network.

According to another aspect of the present invention, there is provided a multi-carrier switching device, wherein a RAN node corresponding to a second link is an anchor point for performing carrier data division/aggregation control, an RAN node corresponding to a first link is an RAN node of an auxiliary link, the device is located at the anchor point, the device comprising: a determining module configured to determine an RAN node of a target auxiliary link corresponding to the first link; and a transmitting module configured to transmit information of the RAN node of the target auxiliary link to an RAN node of a source auxiliary link corresponding to the first link in order to establish a connection with the RAN of the target auxiliary link through the RAN node of the source auxiliary link.

According to another aspect of the present invention, there is provided a multi-carrier switching device, comprising: a determining module configured to determine an RAN node that can continue using aggregation of multiple RAT carriers as a target RAN node of the first link; and a transmitting module configured to transmit a message carrying information of a second link to the target RAN node of the first link, so that data transmission is performed after a connection between the target RAN node corresponding to the first link and an RAN node corresponding to the second link is established.

As may be seen from the above technical solutions, in the method for switching of multi-carrier and device of embodiments of the present invention, by establishing a connection of the target RAN node corresponding to the first link with the RAN node corresponding to the second link, when the first link performs intra-system switching, the target RAN node of the first link and the RAN node of the second link may transmit multiple RAT aggregation data normally, thereby ensuring the continuity of the throughput of service transmission.

BRIEF DESCRIPTION OF DRAWING(S)

In order to explain technical solutions in embodiments of the present invention or the prior art, attached drawings required to be used in a following description of embodiments or the prior art are to be introduced simply. Obviously, attached drawings in the following description are some embodiments of the present invention. On a precondition that no creative efforts are made, those ordinary skilled in the art may also obtain other attached drawings according to these attached drawings.

DESCRIPTION OF EMBODIMENTS

Figure 1:
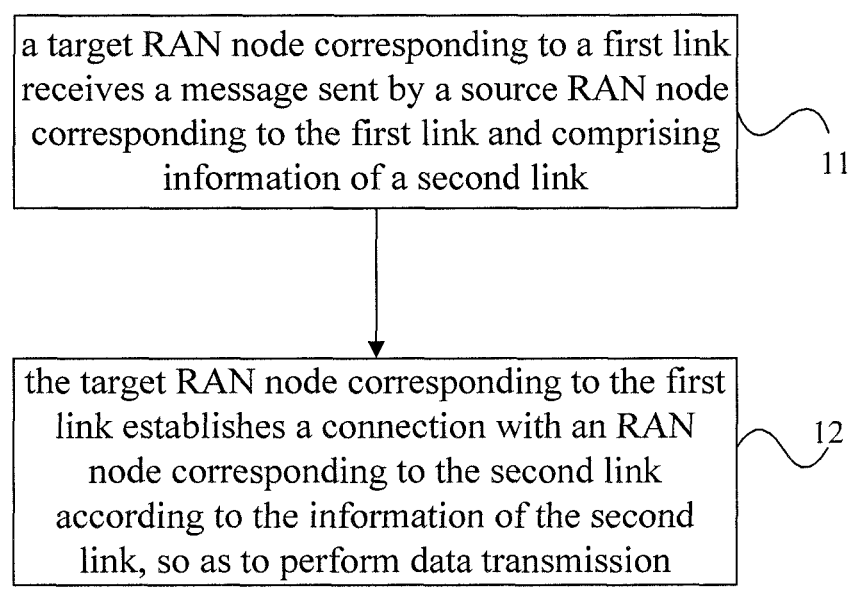
FIG. 1 is a schematic view of a flow of a method for switching of multi-carrier of an embodiment of the present invention.

In order to make objectives, technical solutions and advantages of embodiments of the present invention more clear, a clear and complete description of technical solutions in embodiments of the present invention is given in connection with attached drawings in embodiments of the present invention. Obviously, described embodiments are a part of embodiments of the present invention, but not all of the embodiments. Based on embodiments in the present invention, all the other embodiments obtained by those ordinary skilled in the art on a precondition that no creative efforts are made belong to the protection scope of the present invention.

The UMTS system and the LTE system are taken as examples in embodiments of the present invention. Their corresponding links are a UMTS link (abbreviated to a U link) and an LTE link (abbreviated to an L link) respectively, and corresponding link control nodes are a RNC and an eNB respectively. Upon communication, there is only one anchor point. When the anchor point is the RNC, the primary RAT link is the U link and the auxiliary RAT link is the L link; when the anchor point is the eNB, the primary RAT link is the L link and the auxiliary RAT link is the U link. Similarly, if the UE operates in the LTE and the GERAN systems simultaneously, their corresponding links are an LTE link and a GERAN link respectively, and corresponding link control nodes are an eNodeB and a Base Station Controller (BSC) respectively. When the anchor point is the eNodeB, the primary RAT link is the LTE link and the auxiliary RAT link is the GERAN link; and when the anchor point is the BSC, the primary RAT link is the GERAN link and the auxiliary RAT link is the LTE link.

The switching involved in the present invention means that the link control node of the RAN changes. For example, the link control node of the UMTS system is the RNC, and when the switching occurs, the UE switches from a source RNC to a target RNC; the link control node of the LTE system is the eNB, and when the switching occurs, the UE switches from a source eNB to a target eNB; and the link control node of the GERAN system is the eNB and when the switching occurs, the UE switches from a source BSC to a target BSC. In communication systems of other modes, according to different names of link control nodes, names of link control nodes of the UE where the switching occurs are also different, which is not described redundantly here.

Embodiments of the present invention may be classified as the following scenes:

Scene 1: the primary RAT link switches and the auxiliary RAT link does not switch;

Scene 2: the auxiliary RAT link switches and the primary RAT link does not switch;

Scene 3: both the primary RAT link and the auxiliary RAT link switch;

Scene 4: a single RAT link is switched to a dual RAT link.

Scene 5: a dual RAT link is switched to a single RAT link.

The scene 3 may be achieved by use of a combination of the scenes 1 and 2. For example, the primary RAT link switching flow is first executed, and the auxiliary RAT link switching flow is then executed, or the auxiliary RAT link switching flow is first executed, and the primary RAT link switching flow is then executed, wherein in each flow, the flow of the scene 1 or the scene 2 is executed. Regarding the scene 4, it may be achieved by use of the scene 2 with the single RAT before switching being treated as the auxiliary RAT link. Therefore, embodiments of the present invention will mainly describe the scenes 1 and 2.

FIG. 1 is a schematic view of a flow of a method for switching of multi-carrier of an embodiment of the present invention, which may be described as follows.

11: a target RAN node corresponding to a first link receives a message sent from a source RAN node corresponding to the first link and comprising information of a second link.

The first link is a link in a first RAT network, and the second link is a link in a second RAT network. For the scenes 1 or 2, the first link refers to a link where the switching occurs, and the second link refers to a link where the switching does not occur.

For example, the RNC of the UMTS system is the anchor point, the primary RAT link is the U link and the auxiliary RAT link is the L link; when the primary RAT link switches and the auxiliary RAT link does not switch, the first link is the U link and the second link is the L link; the target RAN node corresponding to the first link is the target RNC and the source RAN node corresponding to the first link is the source RNC. In another embodiment of the present invention, information of the second link is information of the L link. For example, information of the L link may be the eNB identity or the cell ID of the cell the eNB belongs to.

For example, the RNC of the UMTS system is the anchor point, the primary RAT link is the U link and the auxiliary RAT link is the L link; when the primary RAT link does not switch and the auxiliary RAT link switches, the first link is the L link and the second link is the U link; the target RAN node corresponding to the first link is the target eNB and the source RAN node corresponding to the first link is the source eNB. In another embodiment of the present invention, information of the second link is information of the U link. For example, information of the U link may be the RNC Identity (RNC ID) or the cell ID of the cell the RNC belongs to.

For example, the eNB of the LTE system is the anchor point, the primary RAT link is the L link and the auxiliary RAT link is the U link; when the primary RAT link switches and the auxiliary RAT link does not switch, the first link is the L link and the second link is the U link; the target RAN node corresponding to the first link is the target eNB and the source RAN node corresponding to the first link is the source eNB. In another embodiment of the present invention, information of the second link is information of the U link. For example, information of the U link may be the RNC Identity (RNC ID) or the cell ID of the cell the RNC belongs to.

For example, the eNB of the LTE system is the anchor point, the primary RAT link is the L link and the auxiliary RAT link is the U link; when the primary RAT link does not switch and the auxiliary RAT link switches, the first link is the U link and the second link is the L link; the target RAN node corresponding to the first link is the target RNC and the source RAN node corresponding to the first link is the source RNC. In another embodiment of the present invention, information of the second link is information of the L link. For example, information of the L link may be the eNB identity or the cell ID of the cell the eNB belongs to.

In the downlink direction, the anchor point is responsible for receiving data from the core network to which the anchor point belongs and is responsible for distributing data to two different RAT carriers. In the uplink direction, the anchor point is responsible for aggregating data transmitted from a same UE in two different RAT carriers and sending the data to the core network node to which the anchor point belongs. When the primary RAT switches, the RAN nodes corresponding to the first link are the source anchor point and the target anchor point respectively, and at this time, the RAN node corresponding to the second link is the auxiliary RAN node; and when the auxiliary RAT switches, the RAN nodes corresponding to the first link are the source auxiliary RAN node and the target auxiliary RAN node respectively, and the RAN node corresponding to the second link is the anchor point.

Additionally, when there is an interface between the source RAN node and the target RAN node, information of the second link may be directly transmitted via the interface, and the source RAN node may also transmit information of the second link to the target RAN node through the core network. When there is no interface between the source RAN node and the target RAN node, the source RAN node may transmit information of the second link to the target RAN node through the core network.

For example, the source RAN node of the first link needs to transmit target cell information of the first link and information of the second link to the target RAN node of the first link simultaneously. Information of the second link may comprise source link information of the second link and/or target link information of the second link. Source link information refers to information of the link to which the current service cell of the mobile station belongs before the cell switching or the link reconfiguring process occurs. Target link information refers to information of the link to which the service cell of the mobile station belongs after the cell switching or the link reconfiguring process occurs. Link information may comprise one of or arbitrary combination of more than one of cell identity or CGI, or RAN node identity (eNB id or RNC identity), or link identity, etc.

12: the target RAN node corresponding to the first link establishes a connection with the RAN node corresponding to the second link according to information of the second link, so as to perform data transmission.

For example, when the RAN node corresponding to the first link is the link control node of the UMTS system (e.g. RNC), the RAN node corresponding to the second link is the link control node of the LTE system (e.g. eNB). For example, when the RAN node corresponding to the first link is the link control node of the LTE system (e.g. eNB), the RAN node corresponding to the second link is the link control node of the UMTS system (e.g. RNC).

When there has been an interface (e.g. Iue) between the target RAN node of the first link and the RAN node of the second link, the target RAN node may transmit a Connection Setup Indication message to the RAN node of the second link to trigger the Iue interface to work; otherwise, the target RAN node may transmit a Connection Setup Request message to the RAN node of the second link and receive a Connection Setup Response message returned from the RAN node of the second link to establish the Iue interface.

Additionally, on the side of the source RAN node of the first link, the following steps may be performed: the source RAN node of the first link determines an RAN node that can continue using aggregation of multiple RAT carriers as the target RAN node of the first link; the source RAN node of the first link transmits a message carrying information of the second link to the target RAN node of the first link, so that data transmission is performed after the target RAN node corresponding to the first link establishes a connection with the RAN node corresponding to the second link. The source RAN node of the first link may use an RAN node of the first link that has a capability of carrier aggregation and has an interface with the RAN node of the second link as the target RAN node of the first link.

In the present embodiment, by establishing a connection of the target RAN node corresponding to the first link with the RAN node corresponding to the second link, the target RAN node of the first link and the RAN node of the second link may transmit data normally upon switching, thereby ensuring the continuity of the throughput of service transmission.

Figure 2:
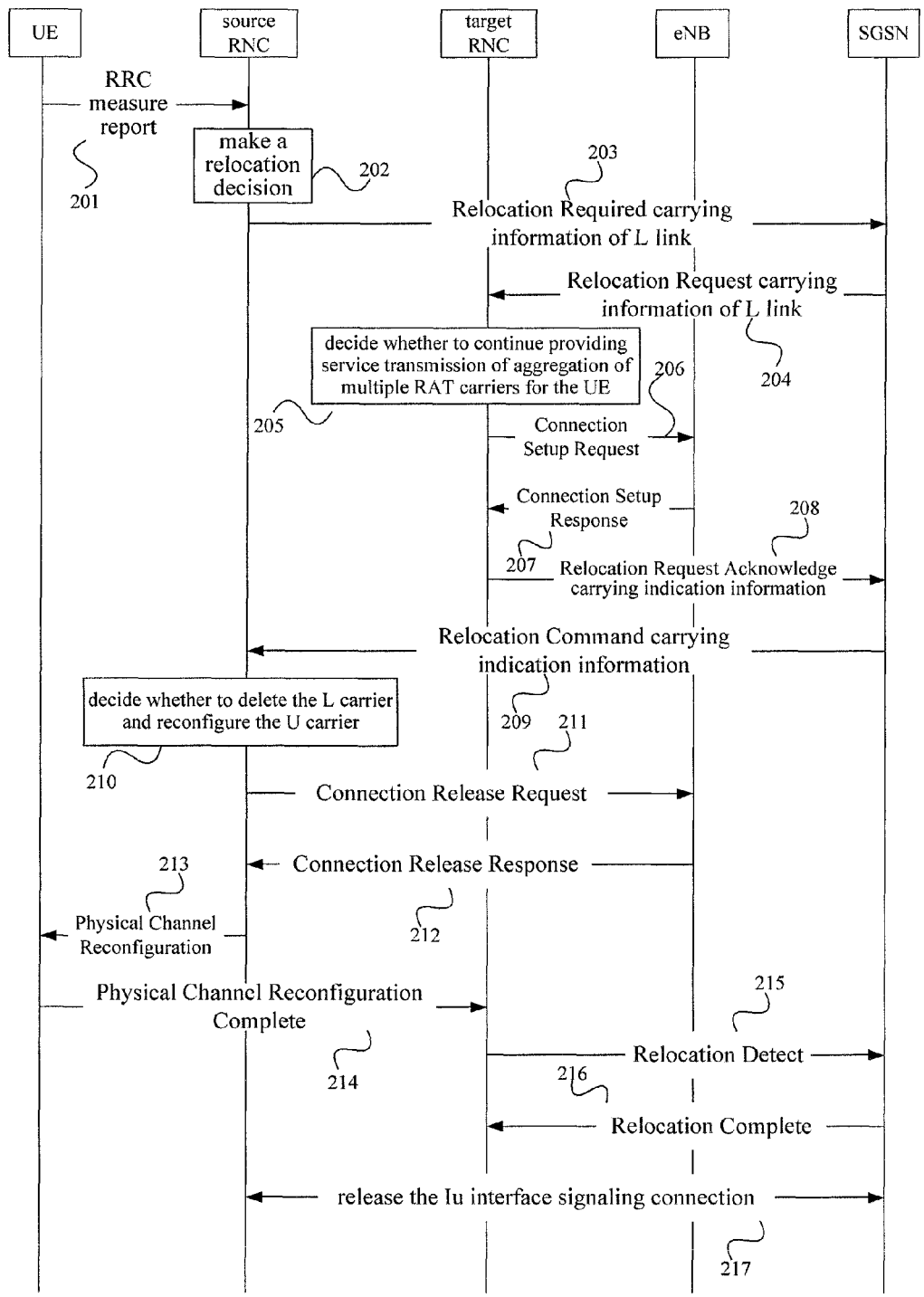
FIG. 2 is a schematic view of a flow of a method for switching of multi-carrier of another embodiment of the present invention.

FIG. 2 is a schematic view of a flow of a method for switching of multi-carrier of another embodiment of the present invention. The application scenes in the present embodiment are as follows: the RNC is the anchor point, the primary RAT link (the U link) switches and the auxiliary RAT link (the L link) does not switch; there is no Iur interface between RNCs, information needs to be transmitted via the Iu interface between the RNC and the core network; the target RAN decides whether to continue using aggregation of multiple RAT carriers (U&L Boosting).

Referring to FIG. 2, the switching method of multiple links of the present embodiment may be as follows.

201: the UE transmits an RRC measure report to the source RNC.

202: the source RNC makes a relocation decision.

For example, according to the signal strength in the RRC measure report, when it is found that there is a different RNC cell the signal of which is stronger than that of the source RNC cell and the switching condition is satisfied, the source RNC decides to switch.

203: the source RNC transmits to the SGSN a message carrying information of the L link, e.g. a Relocation Required message carrying information of the L link, e.g. eNB ID or cell ID of the L link.

204: the SGSN transmits to the target RNC a message carrying information of the L link, e.g. a Relocation Request message carrying information of the L link.

205: the target RNC decides whether to continue providing service transmission of aggregation of multiple RAT carriers for the UE.

Specifically, the target RNC may decide whether to continue performing carrier aggregation according to information of its own aggregation capability of multiple RAT carriers, whether there is an interface between itself and the eNB as well as the load of the target cell.

For example, if the target cell is overloaded, the target RNC transmits to the SGSN a Relocation Failure message carrying a reason value: the target cell is congested. Thereafter, the SGSN transmits to the source RNC a Relocation Preparation Failure message carrying a reason value, for example, the target cell is congested.

Alternatively, when there is no interface between the target RNC and the eNB, an interface, e.g. an hie interface, may be established between the RNC and the eNB.

206: the target RNC transmits to the eNB a request message for establishing an interface, e.g. a Connection Setup Request message.

207: the eNB transmits to the target RNC a corresponding response message, e.g. a Connection Setup Response message.

Through steps 206-207, a signaling connection is established between the target RNC and the eNB.

During execution of steps 206-207, the L link may be activated. For example, the eNB may transmit an indication to deactivate the L link to the UE to avoid loss of the L link data, so that data loss is avoided during establishment of the new connection, or the switching process is simplified.

208: the target RNC transmits to the SGSN a message carrying indication information on whether to continue using carrier aggregation, e.g. a Relocation Request Acknowledge message. When carrier aggregation may not be used, the message carries a reason value, e.g. the RNC does not support U&L carrier aggregation, there is no interface between the target RNC and the eNB (the hardware does not support), resources are insufficient, etc.

209: the SGSN transmits to the source RNC a message carrying indication information, e.g. a Relocation Command message.

210: according to indication information, the source RNC decides whether to delete the L carrier and reconfigure the U carrier.

For example, when indication information indicates that carrier aggregation is not supported, the L carrier is deleted. When the L carrier is deleted, the source RNC may transmit to the eNB an E-RAB release Indication message carrying indication information. A E-RAB release process is performed between the eNB and the UE.

Thereafter, the source RNC transmits data to the target RNC (Start Data Forwarding).

211: the source RNC transmit to the eNB a request message for releasing resources, e.g. a Connection Release Request message.

212: the eNB returns a corresponding response message to the source RNC, e.g. a Connection Release Response message.

213: the source RNC transmits a Physical Channel Reconfiguration message to the UE.

Steps 211-212 may be located after step 213 to delete the connection between the source RNC and the eNB after the L1 synchronization is achieved, so that data loss or drop call due to a case where a new connection is not established successfully because of synchronization failure while the original link has been deleted.

Thereafter, the Layer 1 synchronization flow may be performed between the UE, the source RNC and the target RNC (L1 Synchronization and reception of NBAP: RL Restore indication).

214: the UE transmits a Physical Channel Reconfiguration Complete message to the target RNC.

215: the target RNC transmits a Relocation Detect message to the SGSN.

216: the target RNC transmits a Relocation Complete message to the SGSN

217: the source RNC and the SGSN release the Iu interface signaling connection (Iu Release).

In the present embodiment, the source RNC transmits information of the L link to the target RNC through the core network. When the U link switches, the target RNC may establish a connection with the eNB, thereby ensuring the continuity of the throughput of data transmission upon switching.

Figure 3:
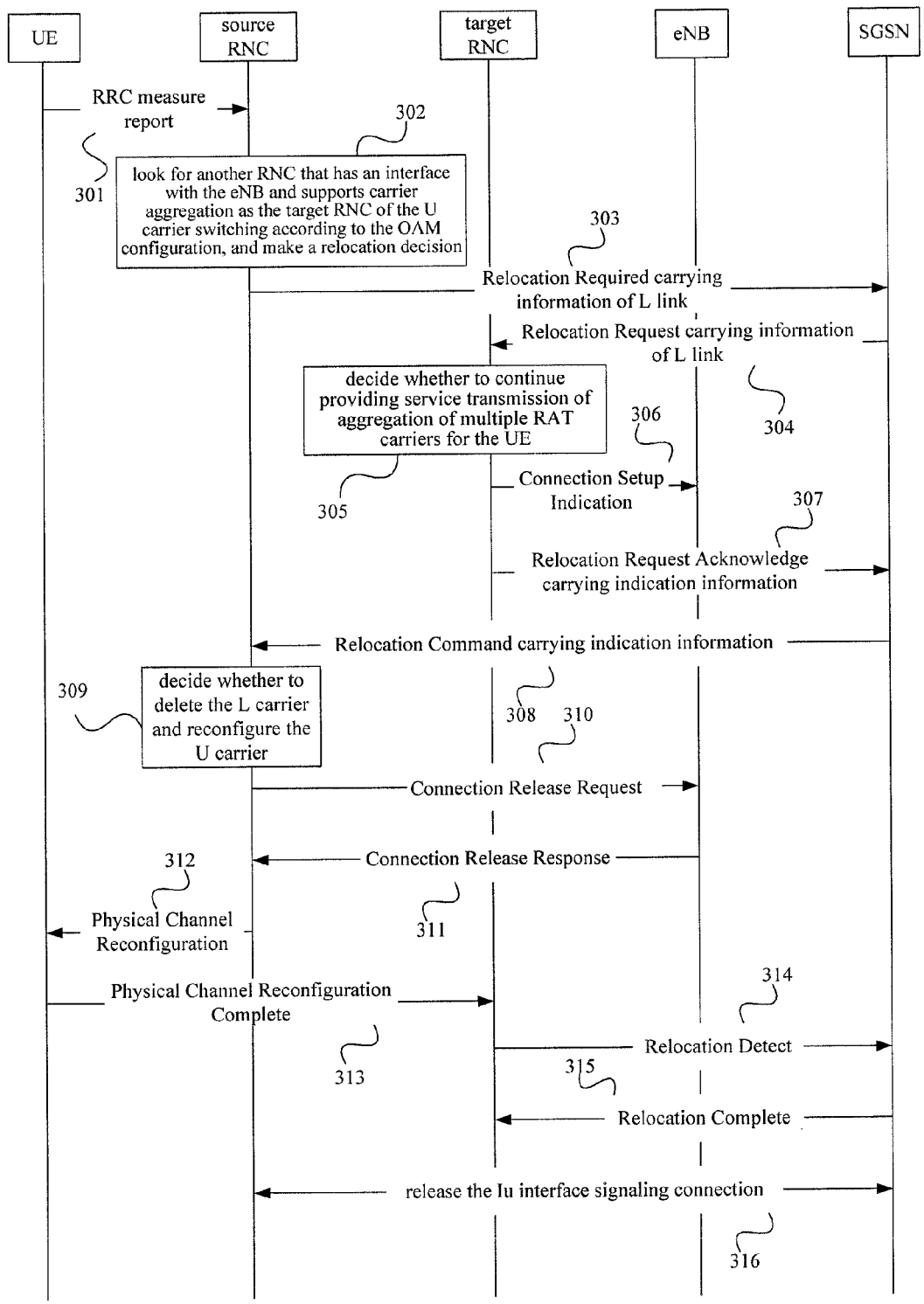
FIG. 3 is a schematic view of a flow of a method for switching of multi-carrier of another embodiment of the present invention.

FIG. 3 is a schematic view of a flow of a method for switching of multi-carrier of another embodiment of the present invention. The application scenes in the present embodiment are as follows: the RNC is the anchor point, the primary RAT link (the U link) switches and the auxiliary RAT link (the L link) does not switch; there is no Iur interface between RNCs, information needs to be transmitted via the Iu interface between the RNC and the core network; the source RNC determines an RNC that can continue using carrier aggregation (U&L Boosting) and has an interface with the eNB as the target RNC.

Referring to FIG. 3, the switching method of multiple links of the present embodiment may be as follows.

301: the UE transmits an RRC measure report to the source RNC.

302: the source RNC looks for another RNC that has an interface with the eNB and supports carrier aggregation as the target RNC of the U carrier switching according to the OAM configuration, and makes a relocation decision.

303: the source RNC transmits to the SGSN a message carrying information of the L link (e.g. eNB ID or cell ID of the L link), e.g. a Relocation Required message.

304: the SGSN transmits to the target RNC a message carrying information of the L link, e.g. a Relocation Request message.

305: the target RNC decides whether to continue providing service transmission of aggregation of multiple RAT carriers for the UE according to the load of the target cell.

For example, if the target cell is currently overloaded, the target RNC transmits to the SGSN a Relocation Failure message carrying a reason value: the target cell is congested. Thereafter, the SGSN transmits to the source RNC a Relocation Preparation Failure message carrying a reason value: the target cell is congested.

Alternatively, when the UE may be supported to continue using aggregation of multiple RAT carriers, the Iue interface signaling connection operation is trigger.

306: the target RNC transmits to the eNB a message for triggering the interface operation, e.g. a Connection Setup Indication message.

During execution of step 306, the L link may be activated. For example, the eNB may transmit an indication to deactivate the L link to the UE to avoid loss of the L link data, so that data loss is avoided during establishment of the new connection, or the switching process is simplified.

307: the target RNC transmits to the SGSN a message carrying indication information on whether to continue using carrier aggregation, e.g. a Relocation Request Acknowledge message. When carrier aggregation may not be used, the message carries a reason value, e.g. resources are insufficient, etc.

308: the SGSN transmits to the source RNC a message carrying indication information, e.g. a Relocation Command message.

309: according to indication information, the source RNC decides whether to delete the L carrier and reconfigure the U carrier.

For example, when indication information indicates that carrier aggregation is not supported, the L carrier is deleted. When the L carrier is deleted, the source RNC may transmit to the eNB an E-RAB release Indication message carrying indication information. A E-RAB release process is performed between the eNB and the UE.

Thereafter, the source RNC transmits data to the target RNC (Start Data Forwarding).

310: the source RNC transmit to the eNB a request message for releasing resources, e.g. a Connection Release Request message.

311: the eNB returns a corresponding response message to the source RNC, e.g. a Connection Release Response message.

312: the source RNC transmits a Physical Channel Reconfiguration message to the UE.

Steps 310-311 may be located after step 312 to delete the connection between the source RNC and the eNB after the L1 synchronization is achieved, so that data loss or drop call due to a case where a new connection is not established successfully because of synchronization failure while the original link has been deleted.

Thereafter, the Layer 1 synchronization flow may be performed between the UE, the source RNC and the target RNC (L1 Synchronization and reception of NBAP: RL Restore indication).

313: the UE transmits a Physical Channel Reconfiguration Complete message to the target RNC.

314: the target RNC transmits a Relocation Detect message to the SGSN.

315: the target RNC transmits a Relocation Complete message to the SGSN

316: the source RNC and the SGSN release the Iu interface signaling connection (Iu Release).

In the present embodiment, the source RNC transmits information of the L link to the target RNC through the core network. When the U link switches, the target RNC may establish a connection with the eNB, thereby ensuring the continuity of the throughput of data transmission upon switching. In the present embodiment, the source RNC determines another RNC as the switching target RNC according to whether another RNC has an interface with the eNB, so that the auxiliary link deletion process due to the fact that the target RNC does not support UL Boosting with the eNB is avoided, while the switching preparation delay is reduced and the overhead of signaling is saved.

Figure 4:
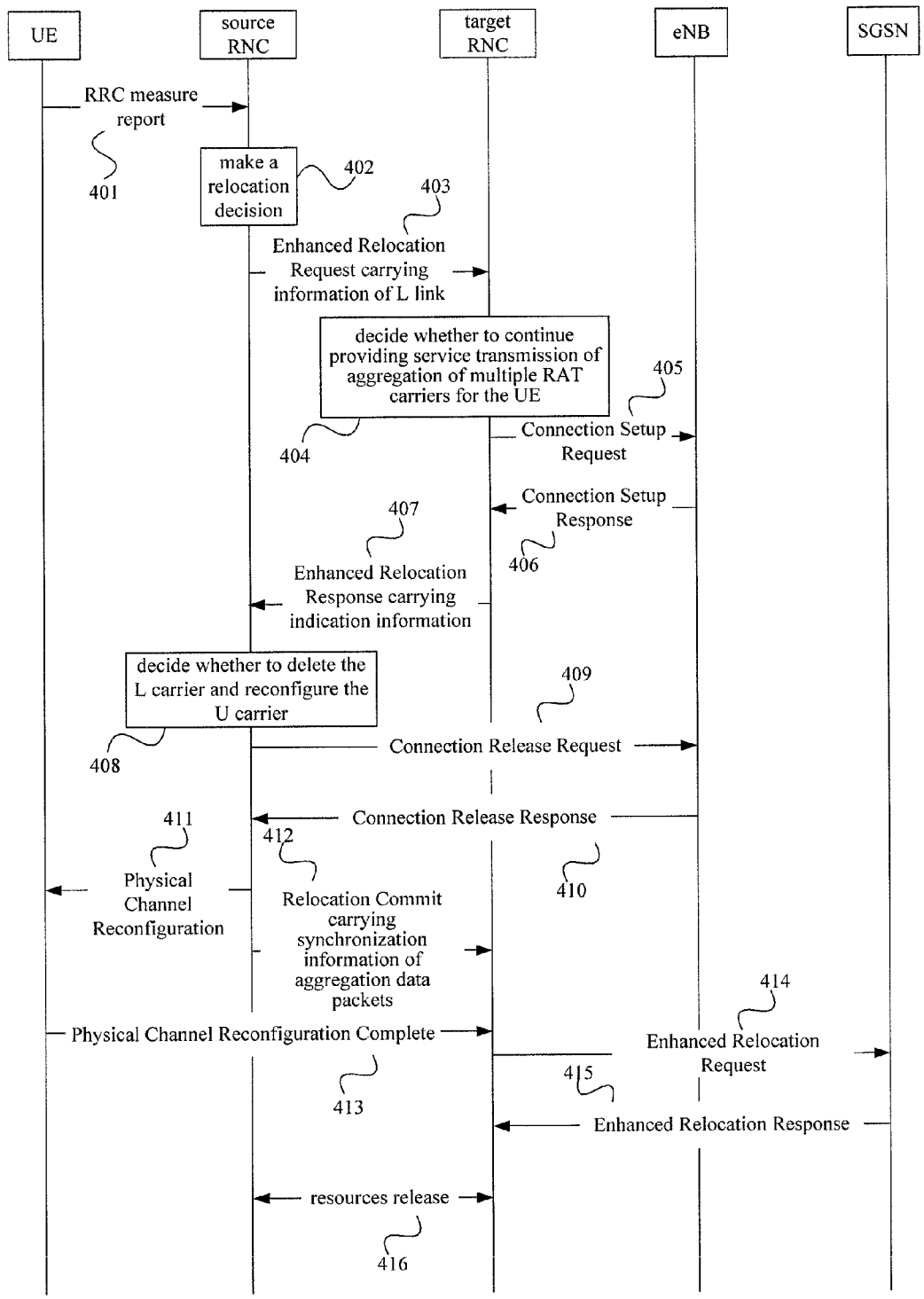
FIG. 4 is a schematic view of a flow of a method for switching of multi-carrier of another embodiment of the present invention.

FIG. 4 is a schematic view of a flow of a method for switching of multi-carrier of another embodiment of the present invention. The application scenes in the present embodiment are as follows: the RNC is the anchor point, the primary RAT link (the U link) switches and the auxiliary RAT link (the L link) does not switch; there is an Iur interface between RNCs, information may be transmitted via the Iur interface between RNCs.

Referring to FIG. 4, the switching method of multiple links of the present embodiment may be as follows.

401: the UE transmits an RRC measure report to the source RNC.

402: the source RNC makes a relocation decision.

For example, according to the signal strength in the RRC measure report, when it is found that there is a different RNC cell the signal of which is stronger than that of the source RNC cell and the switching condition is satisfied, the source RNC decides to switch.

403: the source RNC transmits to the target RNC a message carrying information of the L link (e.g. eNB ID or cell ID of the L carrier), e.g. an Enhanced Relocation Request message.

404: the target RNC decides whether to continue providing service transmission of aggregation of multiple RAT carriers for the UE.

Specifically, the target RNC may decide whether to continue providing service transmission of aggregation of multiple RAT carriers for the UE according to information of its own capability of carrier aggregation, whether there is an interface between itself and the eNB as well as the load of the target cell.

For example, if the target cell is overloaded, the target RNC transmits to the source RNC an Enhanced Relocation Preparation Failure message carrying a reason value: the target cell is congested.

Alternatively, when there is no Iue interface between the target RNC and the eNB, the Iue may be established.

405: the target RNC transmits to the eNB a request message for establishing an interface, e.g. a Connection Setup Request message.

406: the eNB transmits to the target RNC a corresponding response message, e.g. a Connection Setup Response message.

Through steps 405-406, a signaling connection is established between the target RNC and the eNB.

During execution of steps 405-406, the L link may be deactivated. For example, the eNB may transmit an indication to deactivate the L link to the UE to avoid loss of the L link data, so that data loss is avoided during establishment of the new connection, or the switching process is simplified.

407: the target RNC transmits to the source RNC a message carrying indication information on whether to continue using carrier aggregation, e.g. an Enhanced Relocation Response message. When carrier aggregation may not be used, the message carries a reason value, e.g. the RNC does not support U&L carrier aggregation, there is no interface between the target RNC and the eNB, resources are insufficient, etc.

408: according to indication information, the source RNC decides whether to delete the L carrier and reconfigure the U carrier.

For example, when indication information indicates that carrier aggregation is not supported, the L carrier is deleted. When the L carrier is deleted, the source RNC may transmit to the eNB an E-RAB release Indication message carrying indication information. A E-RAB release process is performed between the eNB and the UE.

Thereafter, the source RNC transmits data to the target RNC (Start Data Forwarding).

409: the source RNC transmit to the eNB a request message for releasing resources, e.g. a Connection Release Request message.

410: the eNB returns a corresponding response message to the source RNC, e.g. a Connection Release Response message.

411: the source RNC transmits a Physical Channel Reconfiguration message to the UE.

Steps 409-410 may be located after step 411 to delete the connection between the source RNC and the eNB after the L1 synchronization is achieved, so that data loss or drop call due to a case where a new connection is not established successfully because of synchronization failure while the original link has been deleted.

412: the source RNC transmit to the target RNC a message carrying synchronization information of aggregation data packets, e.g. a Relocation Commit message.

At this time, the SGSN transmits downlink data to the source RNC.

Thereafter, the Layer 1 synchronization flow may be performed between the UE, the source RNC and the target RNC (L1 Synchronization and reception of NBAP: RL Restore indication).

413: the UE transmits a Physical Channel Reconfiguration Complete message to the target RNC.

414: the target RNC transmits an Enhanced Relocation Complete Request message to the SGSN.

415: the target RNC transmits an Enhanced Relocation Complete Response message to the SGSN.

416: the target RNC transmits a Resource Release message to the source RNC.

In the present embodiment, the target RNC decision is taken as an example, similar to the third embodiment. The source RNC may also determine an RNC that can support aggregation and has an interface with the eNB as the target RNC. At this time, the target RNC needs to transmit to the eNB a Connection Setup Indication message, and the overhead of signaling may be saved.

In the present embodiment, the source RNC transmits information of the L link to the target RNC through the interface between RNCs. When the U link switches, the target RNC may establish a connection with the eNB, thereby ensuring the continuity of the throughput of data transmission upon switching.

Figure 5:
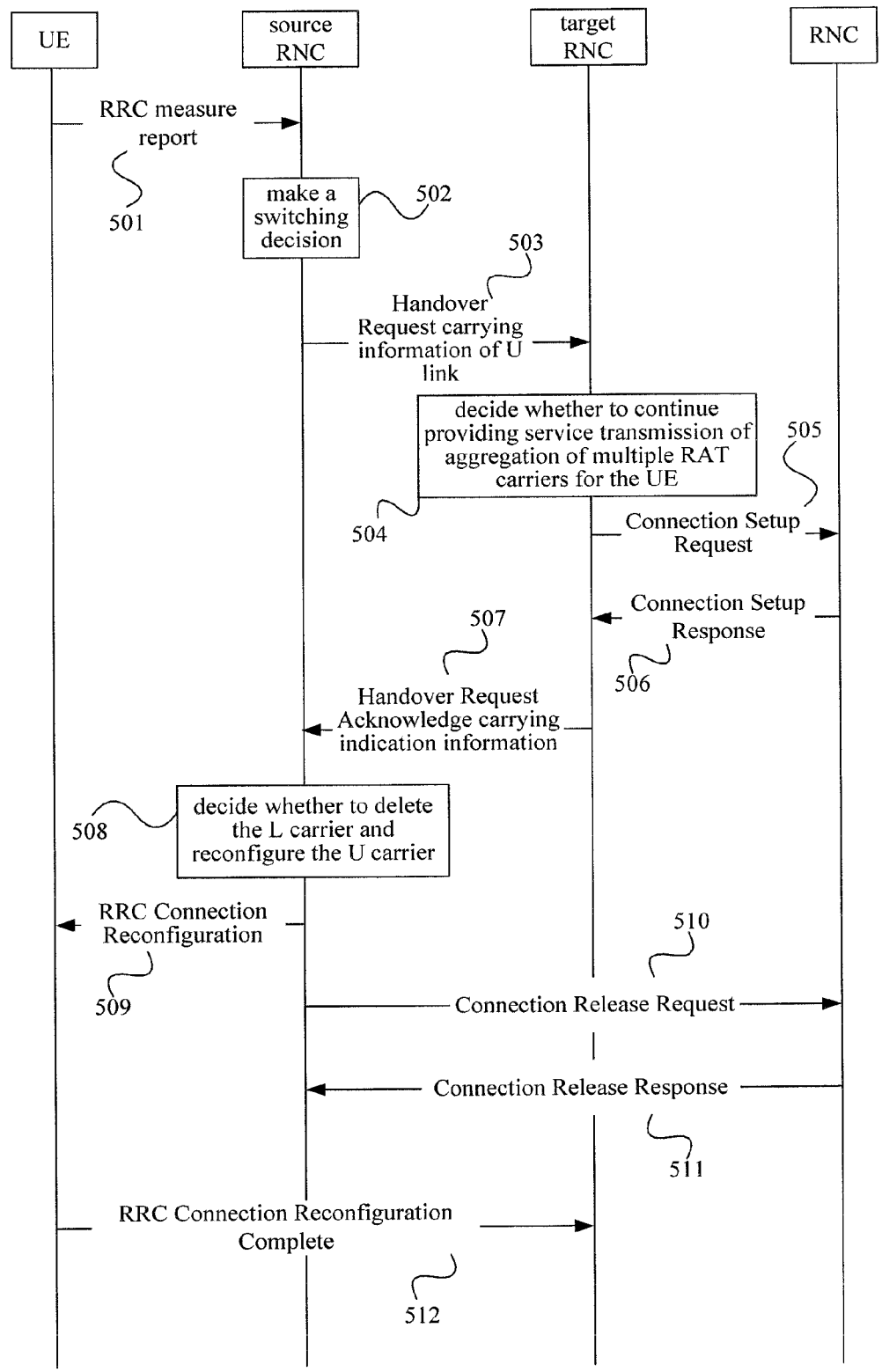
FIG. 5 is a schematic view of a flow of a method for switching of multi-carrier of another embodiment of the present invention.

FIG. 5 is a schematic view of a flow of a method for switching of multi-carrier of another embodiment of the present invention. The application scenes in the present embodiment are as follows: the eNB is the anchor point, the primary RAT link (the L link) switches and the auxiliary RAT link (the U link) does not switch; there is an X2 interface between eNBs, information may be transmitted via the X2 interface between eNBs.

Referring to FIG. 5, the switching method of multiple links of the present embodiment may be as follows.

501: the UE transmits an RRC measure report to the source eNB.

502: the source eNB makes a switching decision.

For example, according to the signal strength in the RRC measure report, when it is found that there is a different eNB cell the signal of which is stronger than that of the source eNB cell and the switching condition is satisfied, the source eNB decides to switch.

503: the source eNB transmits to the target eNB a message carrying information of the U link (e.g. RNC ID or cell ID of the U carrier), e.g. a Handover Request message.

504: the target eNB decides whether to continue providing service transmission of aggregation of multiple RAT carriers for the UE.

Specifically, the target eNB may decide whether to continue providing service transmission of aggregation of multiple RAT carriers for the UE according to information of its own capability of carrier aggregation, whether there is an interface between itself and the RNC as well as the load of the target cell.

For example, if the target cell is overloaded, the target eNB transmits to the source eNB a Handover Relocation Preparation Failure message carrying a reason value: the target cell is congested.

Alternatively, when there is no interface between the target eNB and the RNC, the Iue may be established.

505: the target eNB transmits to the RNC a request message for establishing an interface, e.g. a Connection Setup Request message.

506: the RNC transmits a corresponding response message to the target eNB, e.g. a Connection Setup Response message.

Through steps 505-506, a signaling connection is established between the target eNB and the RNC.

During execution of steps 505-506, the U link may be deactivated. For example, the RNC may transmit an indication to deactivate the U link to the UE to avoid loss of the U link data, so that data loss is avoided during establishment of the new connection, or the switching process is simplified.

507: the target eNB transmits to the source eNB a message carrying indication information on whether to continue using carrier aggregation, e.g. a Handover Request Acknowledge message. When carrier aggregation may not be used, the message carries a reason value, e.g. the eNB does not support U&L carrier aggregation, there is no interface between the target eNB and the RNC, resources are insufficient, etc.

508: according to indication information, the source RNC decides whether to delete the U carrier and reconfigure the L carrier.

For example, when indication information indicates that carrier aggregation is not supported, the U carrier is deleted. When the U carrier is deleted, the source eNB may transmit to the RNC an E-RAB release Indication message carrying indication information. A E-RAB release process is performed between the RNC and the UE.

509: the source eNB transmits an RRC Connection Reconfiguration message to the UE.

Thereafter, the source eNB transmits data to the target eNB (Data Forwarding).

510: the source eNB transmit to the RNC a request message for releasing resources, e.g. a Connection Release Request message.

511: the RNC returns a corresponding response message to the source eNB, e.g. a Connection Release Response message.

The Layer 1 synchronization flow may be performed between the UE, the source eNB and the target eNB (L1 Synchronization).

512: the UE transmits an RRC Connection Reconfiguration Complete message to the target eNB.

In the present embodiment, the target eNB decision is taken as an example, similar to the third embodiment. The source eNB may also determine an eNB that can support aggregation and has an interface with the RNC as the target eNB. At this time, the target eNB needs to transmit to the RNC a Connection Setup Indication message, and the overhead of signaling may be saved.

In the present embodiment, the source eNB transmits information of the U link to the target eNB through the interface between eNBs. When the L link switches, the target eNB may establish a connection with the RNC, thereby ensuring the continuity of the throughput of data transmission upon switching.

Figure 6:
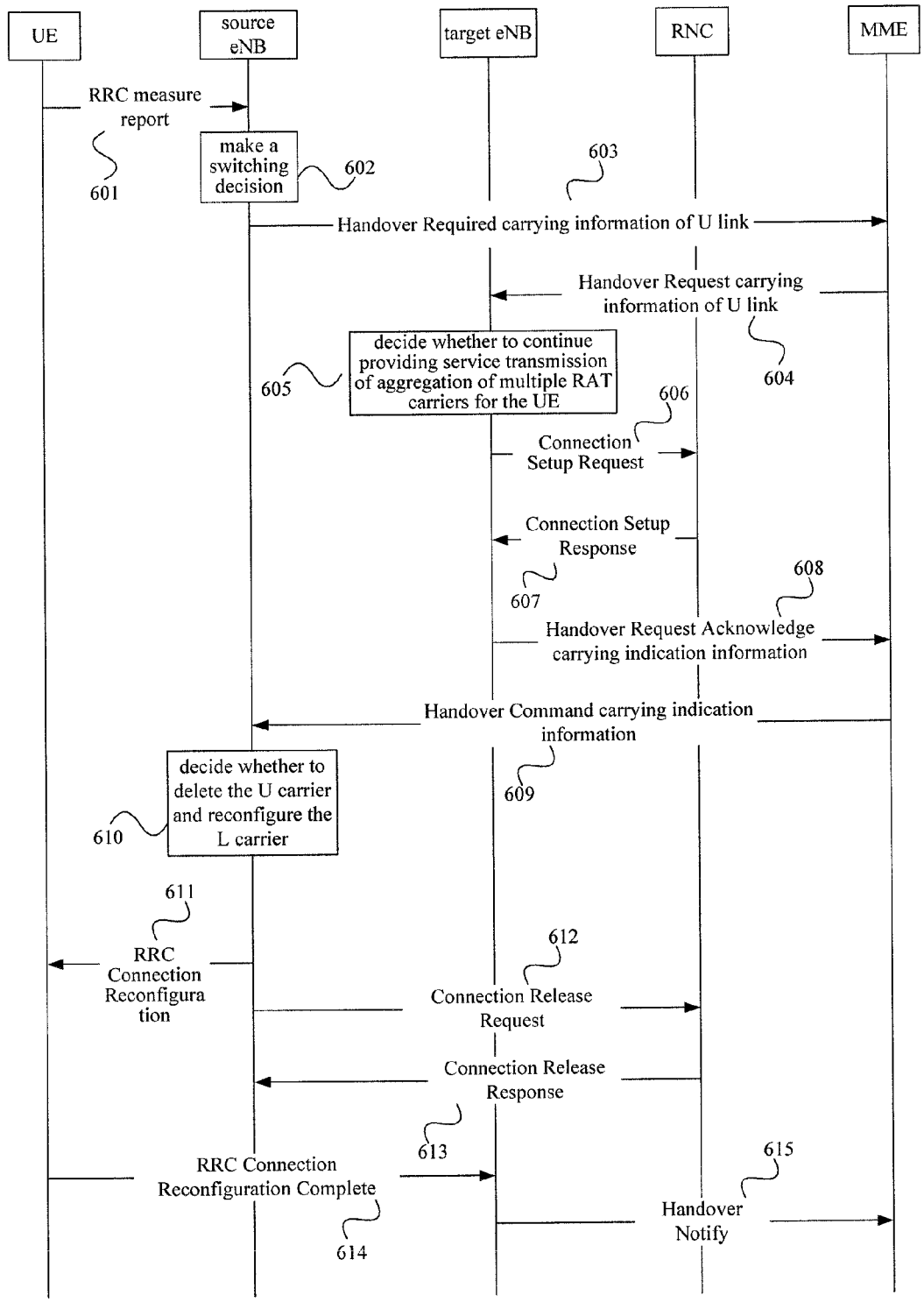
FIG. 6 is a schematic view of a flow of a method for switching of multi-carrier of another embodiment of the present invention.

FIG. 6 is a schematic view of a flow of a method for switching of multi-carrier of another embodiment of the present invention. The application scenes in the present embodiment are as follows: the eNB is the anchor point, the primary RAT link (the L link) switches and the auxiliary RAT link (the U link) does not switch; there is no X2 interface between eNBs, information needs to be transmitted via an S1 interface between the eNB and the core network Referring to FIG. 6, the switching method of multiple links of the present embodiment may be as follows.

601: the UE transmits an RRC measure report to the source eNB.

602: the source eNB makes a switching decision.

See step 502 for detailed content.

603: the source eNB transmits to the MME a message carrying information of the U link (e.g. RNC ID or cell ID of the U link), e.g. a Handover Required message.

604: the MME transmits to the target eNB a message carrying information of the U link, e.g. a Handover Request message.

605: the target eNB decides whether to continue providing service transmission of aggregation of multiple RAT carriers for the UE.

Specifically, the target eNB may decide whether to continue providing service transmission of aggregation of multiple RAT carriers for the UE according to information of its own capability of carrier aggregation, whether there is an interface between itself and the RNC as well as the load of the target cell.

For example, if the target cell is overloaded, the target eNB transmits to the source eNB a Handover Relocation Preparation Failure message carrying a reason value: the target cell is congested.

Alternatively, when there is no Iur interface between the target eNB and the RNC, the Iue may be established.

606: the target eNB transmits to the RNC a request message for establishing an interface, e.g. a Connection Setup Request message.

607: the RNC transmits a corresponding response message to the target eNB, e.g. a Connection Setup Response message.

Through steps 606-607, a logical connection is established between the target eNB and the RNC.

During execution of steps 606-607, the U link may be deactivated. For example, the RNC may transmit an indication to deactivate the U link to the UE to avoid loss of the U link data, so that data loss is avoided during establishment of the new connection, or the switching process is simplified.

608: the target eNB transmits to the MME a message carrying indication information on whether to continue using carrier aggregation, e.g. a Handover Request Acknowledge message. When carrier aggregation may not be used, the message carries a reason value, e.g. the eNB does not support U&L carrier aggregation, there is no interface between the target eNB and the RNC, resources are insufficient, etc.

609: the MME transmits to the source eNB a message carrying indication information, e.g. a Handover Command message. The indication information is the indication information in step 608.

610: according to indication information, the source RNC decides whether to delete the U carrier and reconfigure the L carrier.

For example, when indication information indicates that carrier aggregation is not supported, the U carrier is deleted. When the U carrier is deleted, the source eNB may transmit to the RNC an E-RAB release Indication message carrying indication information. A E-RAB release process is performed between the RNC and the UE.

611: the source eNB transmits an RRC Connection Reconfiguration message to the UE.

Thereafter, the source eNB transmits data to the target eNB (Data Forwarding).

612: the source eNB transmit to the RNC a request message for releasing resources, e.g. a Connection Release Request message.

613: the RNC returns a corresponding response message to the source eNB, e.g. a Connection Release Response message.

The Layer 1 synchronization flow may be performed between the UE, the source eNB and the target eNB (L1 Synchronization).

614: the UE transmits an RRC Connection Reconfiguration Complete message to the target eNB.

615: the target eNB transmits a Handover Notify message to the MME.

In the present embodiment, the target eNB decision is taken as an example, similar to the third embodiment. The source eNB may also determine an eNBC that can support aggregation and has an interface with the RNC as the target eNB. At this time, the target eNB needs to transmit to the RNC a Connection Setup Indication message, and the overhead of signaling may be saved.

In the present embodiment, the source eNB transmits information of the U link to the target eNB through the core network. When the L link switches, the target eNB may establish a connection with the RNC, thereby ensuring the continuity of the throughput of data transmission upon switching.

Figure 7:
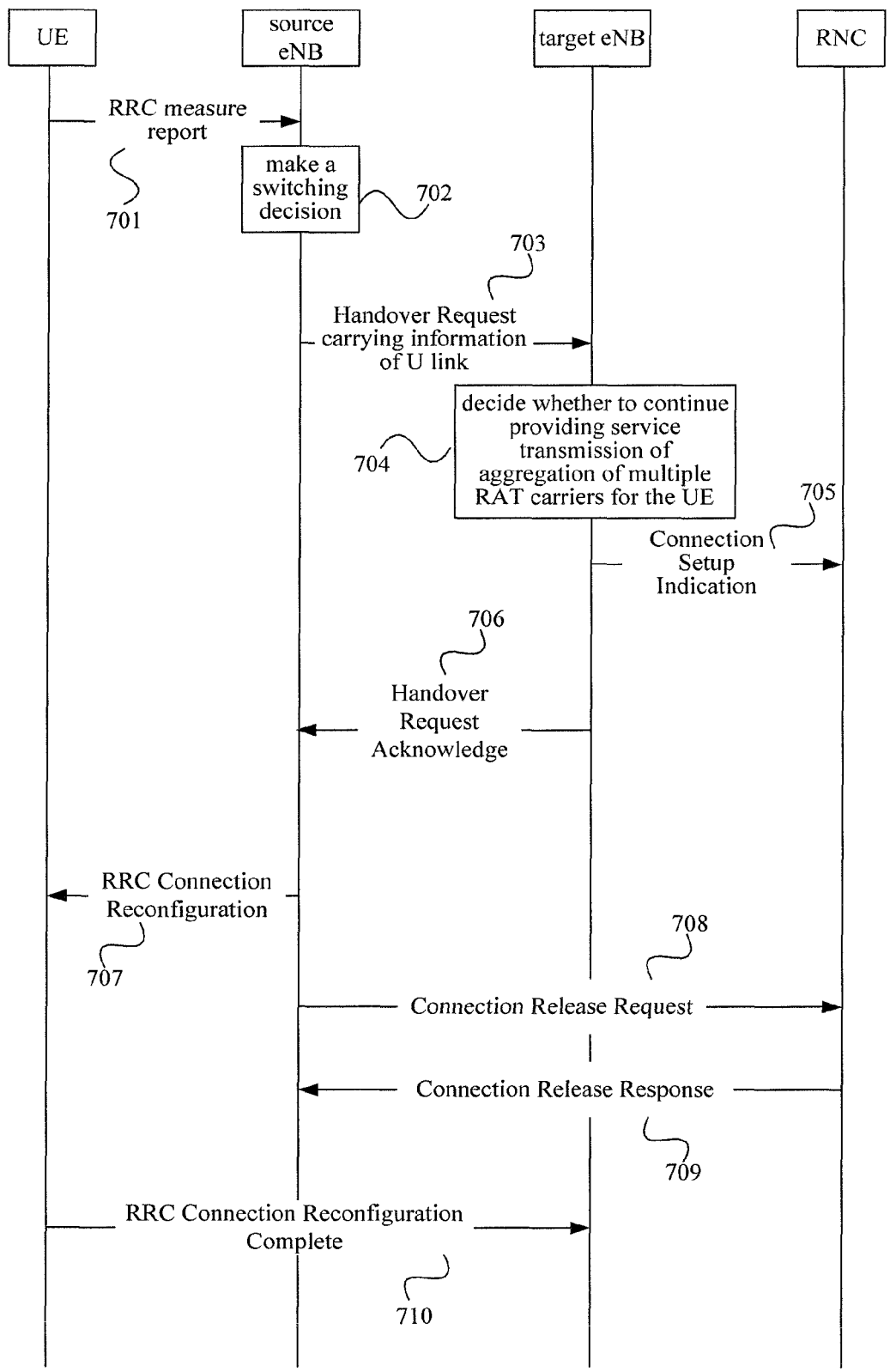
FIG. 7 is a schematic view of a flow of a method for switching of multi-carrier of another embodiment of the present invention.

FIG. 7 is a schematic view of a flow of a method for switching of multi-carrier of another embodiment of the present invention. The application scenes in the present embodiment are as follows: the RNC is the anchor point, the primary RAT link (the U link) does not switch and the auxiliary RAT link (the L link) switches; there is an X2 interface between eNBs, information may be transmitted via the X2 interface between eNBs; the non-anchor point (eNB) is used for the switching control.

Referring to FIG. 7, the switching method of multiple links of the present embodiment may be as follows.

701: the UE transmits an RRC measure report to the source eNB.

702: the source eNB makes a switching decision.

See step 502 for detailed content.

703: the source eNB transmits to the target eNB a message carrying information of the U link (e.g. RNC ID or cell ID of the U carrier), e.g. a Handover Request message.

704: the target eNB decides whether to continue providing service transmission of aggregation of multiple RAT carriers for the UE.

Specifically, the target eNB may decide whether to continue providing service transmission of aggregation of multiple RAT carriers for the UE according to information of its own capability of carrier aggregation, whether there is an interface between itself and the RNC as well as the load of the target cell.

Unlike the primary link switching shown in FIGS. 2-6, since the auxiliary link switches in the present embodiment, in order to save resources, the switching may be continued only when the target eNB has an interface with the RNC and has the capability of carrier. Otherwise, a failure response is directly returned. That is, when the target eNB is currently overloaded, has no aggregation capability or has no interface, the target eNB transmits to the source eNB a message carrying a failure reason value (e.g. the target cell is congested, aggregation is not supported, there is no Iue interface, etc), e.g. a Handover Failure message.

705: the target eNB transmits to the RNC a message for triggering the interface operation, e.g. a Connection Setup Indication message, so as to trigger the Iue interface operation.

During execution of step 705, the U link may be deactivated. For example, the RNC may transmit an indication to deactivate the U link to the UE to avoid loss of the U link data, so that data loss is avoided during establishment of the new connection, or the switching process is simplified.

706: the target eNB transmits to the source eNB a Handover Request Acknowledge message.

707: the source eNB transmits an RRC Connection Reconfiguration message to the UE.

Thereafter, the source eNB may transmit data to the target eNB (Data Forwarding).

708: the source eNB transmit to the RNC a request message for releasing resources, e.g. a Connection Release Request message.

709: the RNC returns a corresponding response message to the source eNB, e.g. a Connection Release Response message.

Thereafter, the Layer 1 synchronization flow may be performed between the UE, the source eNB and the target eNB (L1 Synchronization).

710: the UE transmits an RRC Connection Reconfiguration Complete message to the target eNB.

In the present embodiment, the source eNB transmits information of the U link to the target eNB via the interface between eNBs. When the L link switches, the target eNB establishes a connection with the RNC, thereby ensuring the continuity of the throughput of data transmission upon switching.

Figure 8:
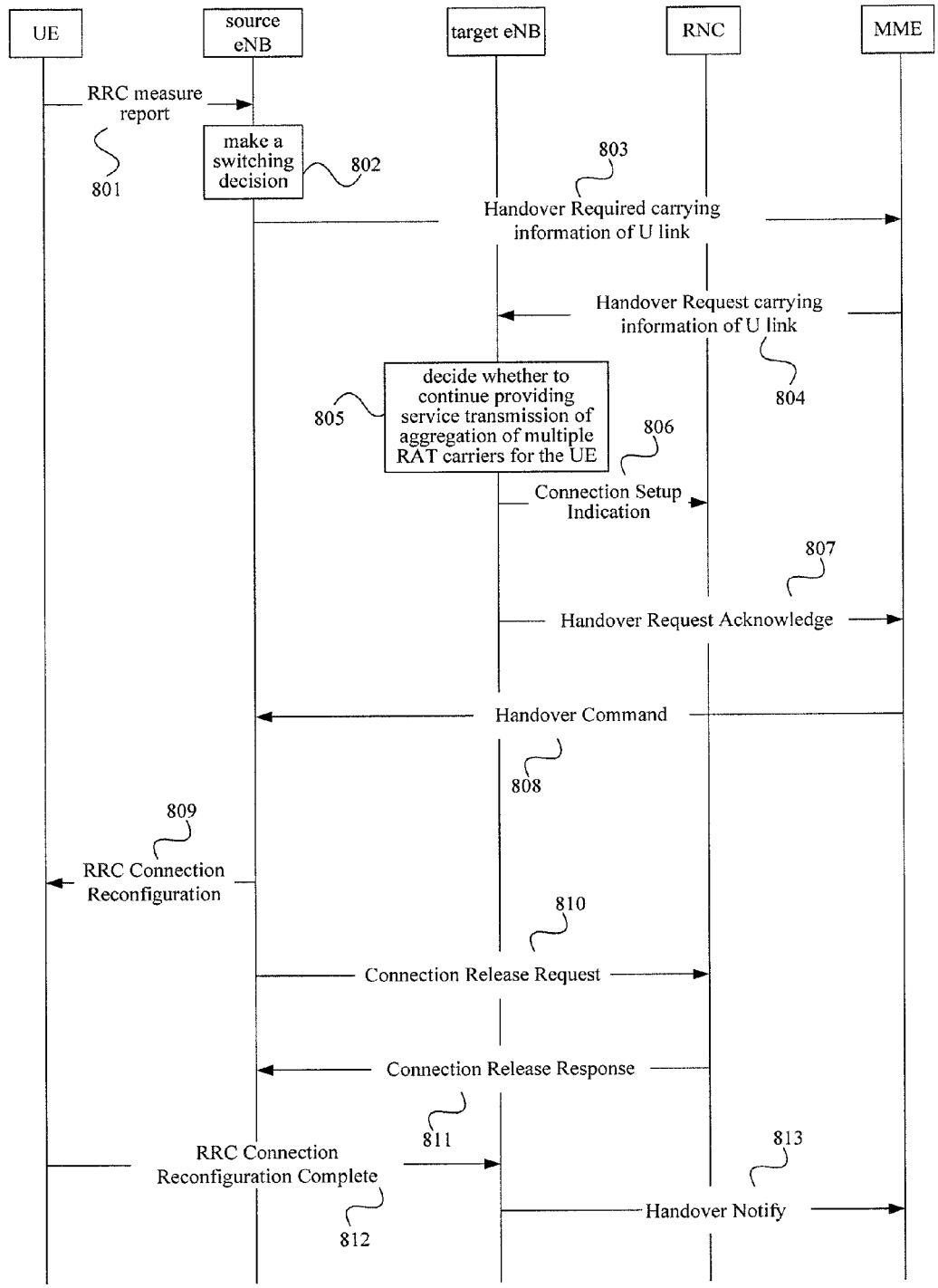
FIG. 8 is a schematic view of a flow of a method for switching of multi-carrier of another embodiment of the present invention.

FIG. 8 is a schematic view of a flow of a method for switching of multi-carrier of another embodiment of the present invention. The application scenes in the present embodiment are as follows: the RNC is the anchor point, the primary RAT link (the U link) does not switch and the auxiliary RAT link (the L link) switches; there is no X2 interface between eNBs, information needs to be transmitted via an S1 interface between the eNB and the core network; the non-anchor point (eNB) is used for the switching control.

Referring to FIG. 8, the switching method of multiple links of the present embodiment may be as follows.

801: the UE transmits an RRC measure report to the source eNB.

802: the source eNB makes a switching decision.

See step 502 for detailed content.

803: the source eNB transmits to the MME a message carrying information of the U link (e.g. RNC ID or cell ID of the U link), e.g. a Handover Required message.

804: the MME transmits to the target eNB a message carrying information of the U link, e.g. a Handover Request message.

805: the target eNB decides whether to continue providing service transmission of aggregation of multiple RAT carriers for the UE.

Specifically, the target eNB may decide whether to continue providing service transmission of aggregation of multiple RAT carriers for the UE according to information of its own capability of carrier aggregation, whether there is an interface between itself and the RNC as well as the load of the target cell.

Unlike the primary link switching shown in FIGS. 2-6, since the auxiliary link switches in the present embodiment, in order to save resources, the switching may be continued only when the target eNB has an interface with the RNC and has the capability of carrier. Otherwise, a failure response is directly returned. That is, when the target eNB is currently overloaded, has no aggregation capability or has no interface, the target eNB transmits to the MME a message carrying a failure reason value (e.g. the target cell is congested, aggregation is not supported, there is no Iue interface, etc), e.g. a Handover Preparation Failure message. Thereafter, the MME transmits to the source base station a Handover Failure message carrying the above failure reason.

806: the target eNB transmits to the RNC a message for triggering the interface operation, e.g. a Connection Setup Indication message, so as to trigger the Iue interface operation.

807: the target eNB transmits to the MME a Handover Request Acknowledge message.

808: the MME transmits to the source eNB a Handover Command message.

809: the source eNB transmits an RRC Connection Reconfiguration message to the UE.

810: the source eNB transmit to the RNC a Connection Release Request message.

811: the RNC returns a Connection Release Response message to the source eNB.

Thereafter, the Layer 1 synchronization flow may be performed between the UE, the source eNB and the target eNB (L1 Synchronization).

812: the UE transmits an RRC Connection Reconfiguration Complete message to the target eNB.

813: the target eNB transmits a Handover Notify message to the MME.

In the present embodiment, the source eNB transmits information of the U link to the target eNB through the core network. When the L link switches, the target eNB may establish a connection with the RNC, thereby ensuring the continuity of the throughput of data transmission upon switching.

Figure 9:
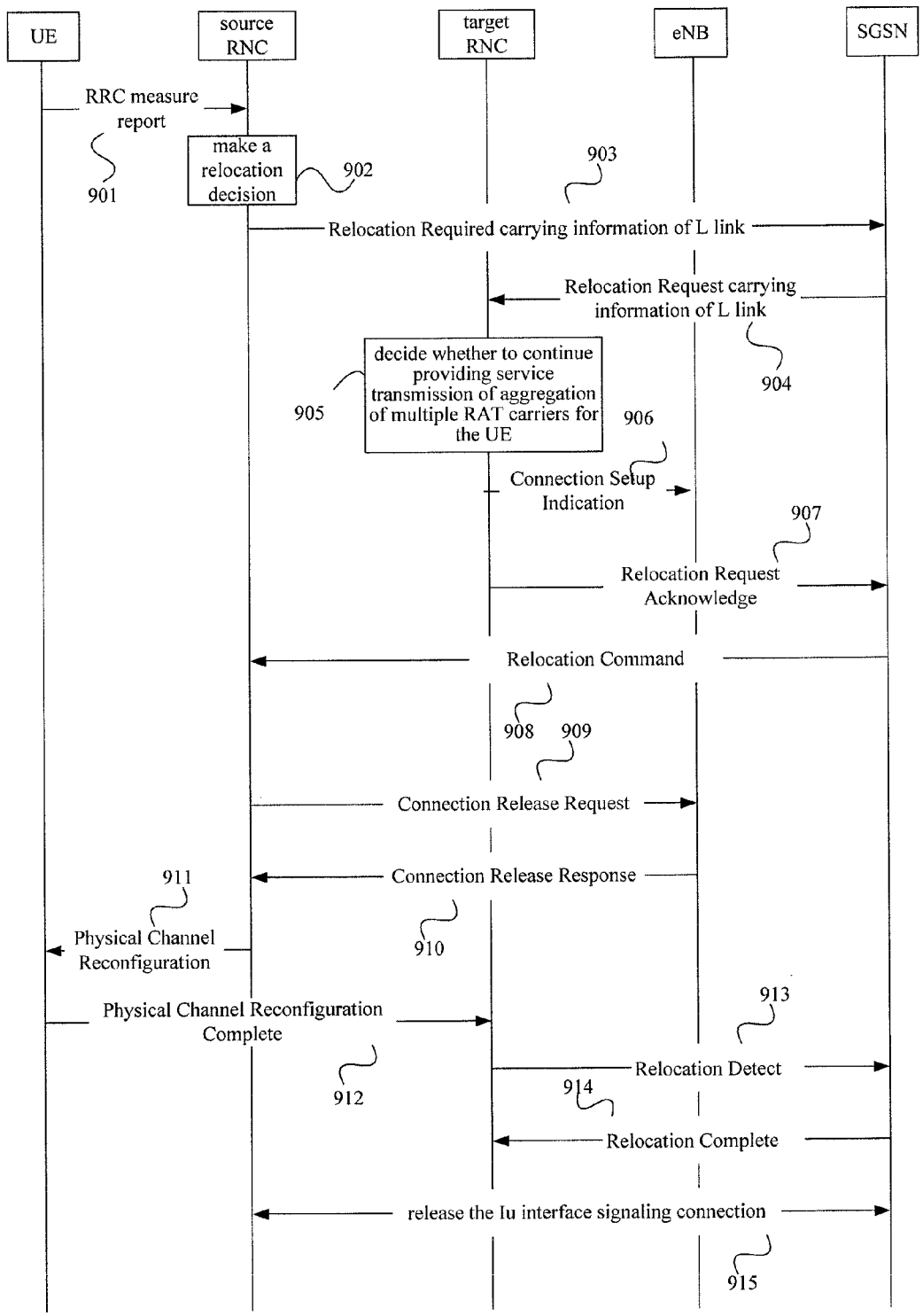
FIG. 9 is a schematic view of a flow of a method for switching of multi-carrier of another embodiment of the present invention.

FIG. 9 is a schematic view of a flow of a method for switching of multi-carrier of another embodiment of the present invention. The application scenes in the present embodiment are as follows: the eNB is the anchor point, the primary RAT link (the L link) does not switch and the auxiliary RAT link (the U link) switches; there is no Iur interface between RNCs, information needs to be transmitted via the Iu interface between the RNC and the core network; the non-anchor point (eNB) is used for the switching control.

Referring to FIG. 9, the switching method of multiple links of the present embodiment may be as follows.

901: the UE transmits an RRC measure report to the source RNC.

902: the source RNC makes a relocation decision.

See step 202 for detailed content.

903: the source RNC transmits to the SGSN a message carrying information of the L link (e.g. eNB ID or cell ID of the L link), e.g. a Relocation Required message.

904: the SGSN transmits to the target RNC a message carrying information of the L link, e.g. a Relocation Request message.

905: the target RNC decides whether to continue providing service transmission of aggregation of multiple RAT carriers for the UE.

Specifically, the target RNC may decide whether to continue providing service transmission of aggregation of multiple RAT carriers for the UE according to information of its own capability of carrier aggregation, whether there is an interface between itself and the eNB as well as its current own load.

Unlike the primary link switching shown in FIGS. 2-6, since the auxiliary link switches in the present embodiment, in order to save resources, the switching may be continued only when the target RNC has an interface with the eNB and has the capability of carrier. Otherwise, a failure response is directly returned. That is, when the target RNC is currently overloaded, has no aggregation capability or has no interface, the target RNC transmits to the SGSN a message carrying a failure reason value (e.g. the target eNB is congested, aggregation is not supported, there is no Iue interface, etc), e.g. a Relocation Failure message. Thereafter, the SGSN transmits to the source RNC a Relocation Preparation Failure message carrying the above failure reason value.

906: the target RNC transmits to the eNB a message for triggering the interface operation, e.g. a Connection Setup Indication message.

During execution of steps 906, the L link may be deactivated. For example, the eNB may transmit an indication to deactivate the L link to the UE to avoid loss of the L link data, so that data loss is avoided during establishment of the new connection, or the switching process is simplified.

907: the target RNC transmits to the SGSN a Relocation Request Acknowledge message.

908: the SGSN transmits to the source RNC a Relocation Command message.

Thereafter, the source RNC transmits data to the target RNC (Start Data Forwarding).

909: the source RNC transmit to the eNB a request message for releasing resources, e.g. a Connection Release Request message.

910: the eNB returns a corresponding response message to the source RNC, e.g. a Connection Release Response message.

911: the source RNC transmits a Physical Channel Reconfiguration message to the UE.

Steps 909-910 may be located after step 911 to delete the connection between the source RNC and the eNB after the L1 synchronization is achieved, so that data loss or drop call due to a case where a new connection is not established successfully because of synchronization failure while the original link has been deleted.

Thereafter, the Layer 1 synchronization flow may be performed between the UE, the source RNC and the target RNC (L1 Synchronization and reception of NBAP: RL Restore indication).

912: the UE transmits a Physical Channel Reconfiguration Complete message to the target RNC.

913: the target RNC transmits a Relocation Detect message to the SGSN.

914: the target RNC transmits a Relocation Complete message to the SGSN

915: the source RNC and the SGSN release the Iu interface signaling connection (Iu Release).

In the present embodiment, the source RNC transmits information of the L link to the target RNC through the core network. When the U link switches, the target RNC may establish a connection with the eNB, thereby ensuring the continuity of the throughput of data transmission upon switching.

Figure 10:
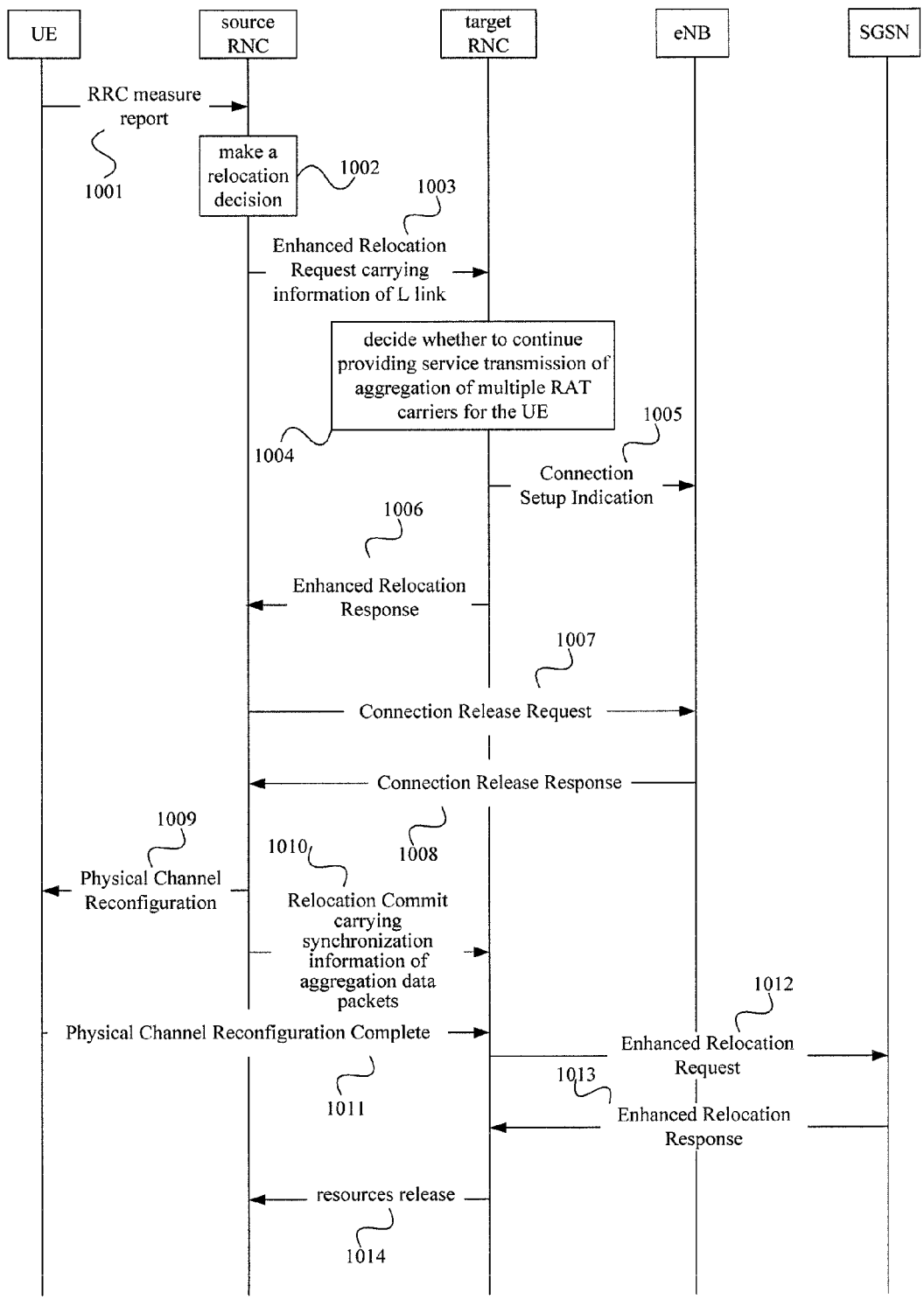
FIG. 10 is a schematic view of a flow of a method for switching of multi-carrier of another embodiment of the present invention.

FIG. 10 is a schematic view of a flow of a method for switching of multi-carrier of another embodiment of the present invention. The application scenes in the present embodiment are as follows: the eNB is the anchor point, the primary RAT link (the L link) does not switch and the auxiliary RAT link (the U link) switches; there is an Iur interface between RNCs, information may be transmitted via the Iur interface between RNCs; the non-anchor point (eNB) is used for the switching control.

Referring to FIG. 10, the switching method of multiple links of the present embodiment may be as follows.

1001: the UE transmits an RRC measure report to the source RNC.

1002: the source RNC makes a relocation decision.

See step 202 for detailed content.

1003: the source RNC transmits to the target RNC a message carrying information of the L link (e.g. eNB ID or cell ID of the L carrier), e.g. an Enhanced Relocation Request message.

1004: the target RNC decides whether to continue providing service transmission of aggregation of multiple RAT carriers for the UE.

Specifically, the target RNC may decide whether to continue providing service transmission of aggregation of multiple RAT carriers for the UE according to information of its own capability of carrier aggregation, whether there is an interface between itself and the eNB as well as the load of the target cell.

Unlike the primary link switching shown in FIGS. 2-6, since the auxiliary link switches in the present embodiment, in order to save resources, the switching may be continued only when the target RNC has an interface with the eNB and has the capability of carrier. Otherwise, a failure response is directly returned. That is, when the target RNC is currently overloaded, has no aggregation capability or has no interface, the target RNC transmits to the SGSN a message carrying a failure reason value (e.g. the target eNB is congested, aggregation is not supported, there is no Iue interface, etc), e.g. a Relocation Failure message. Thereafter, the SGSN transmits to the source RNC a Relocation Preparation Failure message carrying the above failure reason value.

1005: the target RNC transmits to the eNB a message for triggering the interface operation, e.g. a Connection Setup Indication message.

During execution of steps 906, the L link may be deactivated. For example, the eNB may transmit an indication to deactivate the L link to the UE to avoid loss of the L link data, so that data loss is avoided during establishment of the new connection, or the switching process is simplified.

1006: the target RNC transmits to the source RNC an Enhanced Relocation Response message.

Thereafter, the source RNC transmits data to the target RNC (Start Data Forwarding).

1007: the source RNC transmit to the eNB a request message for releasing resources, e.g. a Connection Release Request message.

1008: the eNB returns a corresponding response message to the source RNC, e.g. a Connection Release Response message.

1009: the source RNC transmits a Physical Channel Reconfiguration message to the UE.

Steps 1007-1008 may be located after step 1009 to delete the connection between the source RNC and the eNB after the L1 synchronization is achieved, so that data loss or drop call due to a case where a new link is not established successfully because of synchronization failure while the original link has been deleted.

1010: the source RNC transmit to the target RNC a message carrying synchronization information of aggregation data packets, e.g. a Relocation Commit message.

At this time, the SGSN transmits downlink data to the source RNC.

Thereafter, the Layer 1 synchronization flow may be performed between the UE, the source RNC and the target RNC (L1 Synchronization and reception of NBAP: RL Restore indication).

1011 the UE transmits a Physical Channel Reconfiguration Complete message to the target RNC.

1012: the target RNC transmits an Enhanced Relocation Complete Request message to the SGSN.

1013: the target RNC transmits an Enhanced Relocation Complete Response message to the SGSN.

1014: the target RNC transmits a Resource Release message to the source RNC.

In the present embodiment, the source RNC transmits information of the L link to the target RNC through the interface between RNCs. When the U link switches, the target RNC may establish a connection with the eNB, thereby ensuring the continuity of the throughput of data transmission upon switching.

In FIGS. 7-10, the non-anchor point is used for the switching control upon switching. Of course, the anchor point may be used for the switching control upon switching. That is, the RAN node corresponding to the second link is the anchor point for carrier data aggregation/division control, and the RAN node corresponding to the first link is the RAN node of the auxiliary link. The method comprises: the anchor point for carrier data aggregation/division control corresponding to the second link determines the RAN node of the target auxiliary link corresponding to the first link; the anchor point transmits information of the RAN node of the target auxiliary link to the RAN node of the source auxiliary link corresponding to the first link, to establish a connection with the RAN of the target auxiliary link through the RAN node of the source auxiliary link. The following embodiments may be seen for detailed content.

Figure 11:
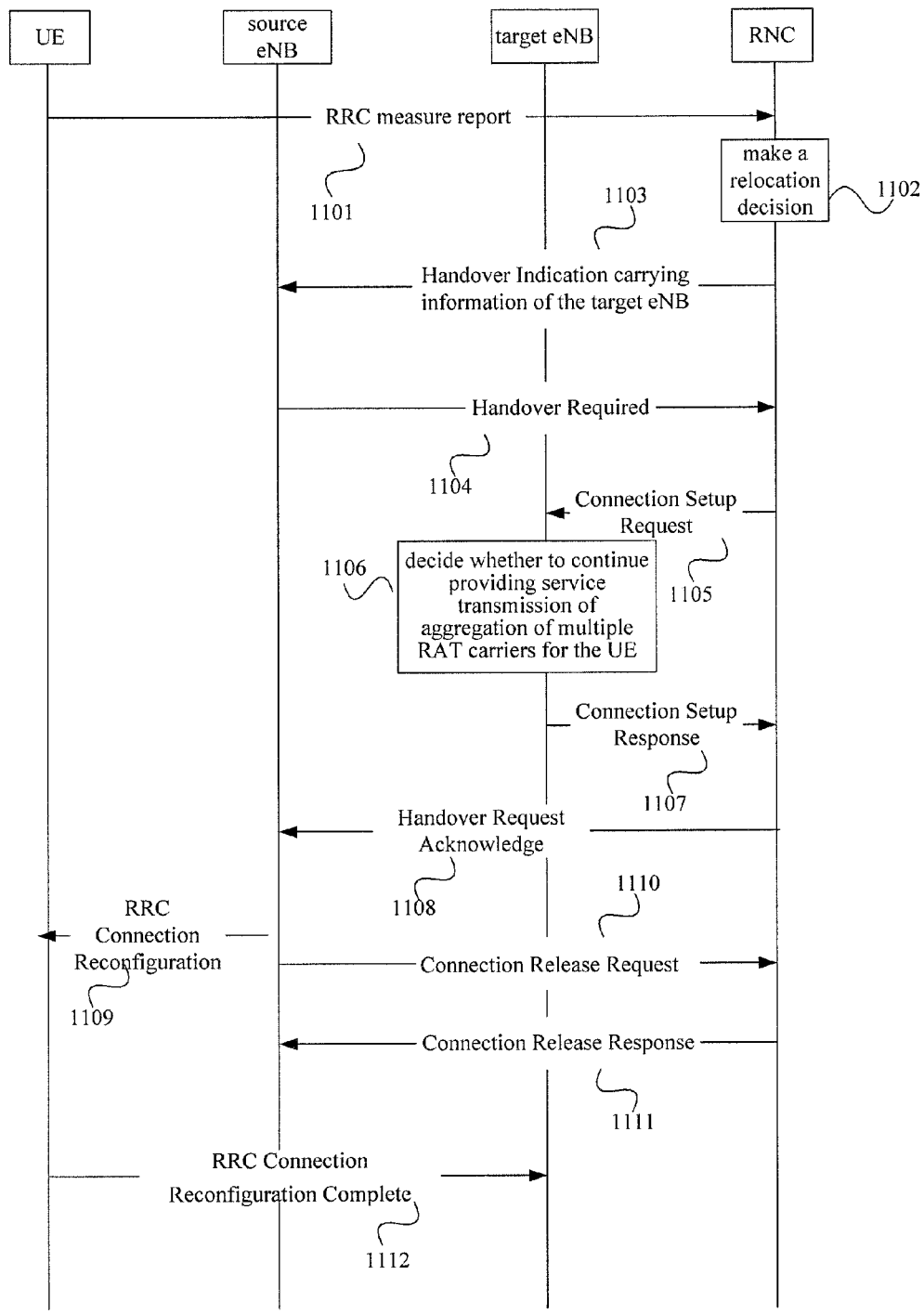
FIG. 11 is a schematic view of a flow of a method for switching of multi-carrier of another embodiment of the present invention.

FIG. 11 is a schematic view of a flow of a method for switching of multi-carrier of another embodiment of the present invention. The application scenes in the present embodiment are as follows: the RNC is the anchor point, the primary RAT link (the U link) does not switch and the auxiliary RAT link (the L link) switches; the anchor point (RNC) is used for the switching control.

Referring to FIG. 11, the switching method of multiple links of the present embodiment may be as follows.

1101: the UE transmits an RRC measure report to the RNC.

The RRC measure report may be obtained through a heterogeneous system measurement of the L carrier.

Additionally, step 1101 may also be replaced as follows:

The UE transmits the RRC measure report to the source eNB, and the RRC measure report may be obtained through an intra-system measurement;

The source eNB determines the best cell according to the RRC measure report, thereafter, transmits to the RNC a message indicating the best cell, e.g. a Best Cell Indicator.

1102: the RNC makes a relocation decision, and determines the target eNB.

The RNC may determine the target eNB according to the RRC measure report, and the target eNB has an interface with the RNC;

Alternatively, when the source eNB transmits the Best Cell Indicator to the RNC, the RNC determines the target eNB according to the Best Cell Indicator.

1103: the RNC transmits to the source cell a message carrying information of the target eNB (e.g. eNB ID of the target eNB), e.g. a Handover Indication message.

If there is an X2 interface between the source eNB and the target eNB, steps 703-710 are performed subsequently.

1104: If there is no X2 interface between the source eNB and the target eNB, the source eNB transmits to the RNC a message for handover, e.g. a Handover Required message.

1105: the RNC transmits to the target eNB a request message for establishing an interface, e.g. a Connection Setup Request message.

1106: the target eNB decides whether to continue providing service transmission of aggregation of multiple RAT carriers for the UE.

Specifically, the target RNC may decide whether to continue providing service transmission of aggregation of multiple RAT carriers for the UE according to information of its own capability of carrier aggregation and the load of the target cell.

1107: when carrier aggregation may be continued to be used, the target eNB transmits to the RNC a corresponding response message, e.g. a Connection Setup Response message.

Establishment of the above connection between the target eNB and the RNC is initiated by the RNC. Also, similar to aforementioned embodiments, ID of the RNC may be transmitted to the target eNB, and the target eNB initiates establishment of the connection.

1108: the RNC transmits to the source eNB a message corresponding to the handover request, e.g. a Handover Request Acknowledge message.

1109: the source eNB transmits an RRC Connection Reconfiguration message to the UE.

Thereafter, the source eNB may transmit data to the target eNB (Data Forwarding).

1110: the source eNB transmits to the RNC a request message for releasing resources, e.g. a Connection Release Request message.

1111: the RNC returns a corresponding response message to the source eNB, e.g. a Connection Release Response message.

Thereafter, the Layer 1 synchronization flow may be performed between the UE, the source eNB and the target eNB (L1 Synchronization).

1112: the UE transmits an RRC Connection Reconfiguration Complete message to the target eNB.

In the present embodiment, the RNC transmits a connection setup request to the target eNB. When the L link switches, the target eNB may establish a connection with the RNC, thereby ensuring the continuity of the throughput of data transmission upon switching.

Figure 12:
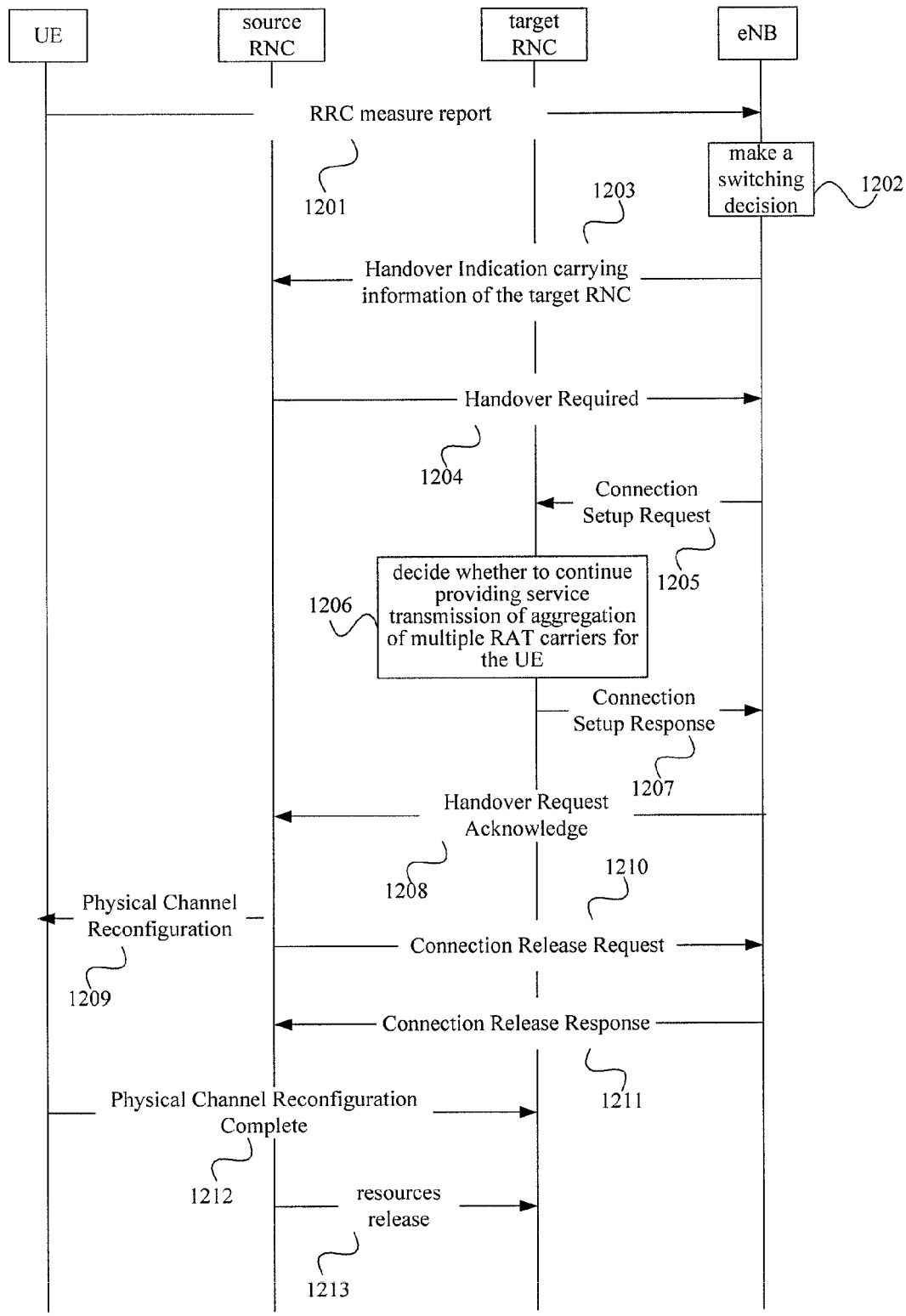
FIG. 12 is a schematic view of a flow of a method for switching of multi-carrier of another embodiment of the present invention.

FIG. 12 is a schematic view of a flow of a method for switching of multi-carrier of another embodiment of the present invention. The application scenes in the present embodiment are as follows: the eNB is the anchor point, the primary RAT link (the L link) does not switch and the auxiliary RAT link (the U link) switches; the anchor point (eNB) is used for the switching control.

Referring to FIG. 12, the switching method of multiple links of the present embodiment may be as follows.

1201: the UE transmits an RRC measure report to the eNB.

The RRC measure report may be obtained through a heterogeneous system measurement of the L carrier.

Additionally, step 1201 may also be replaced as follows:

The UE transmits the RRC measure report to the source RNC, and the RRC measure report may be obtained through an intra-system measurement;

The source RNC determines the best cell according to the RRC measure report, thereafter, transmits to the eNB a message indicating the best cell, e.g. a Best Cell Indicator.

1202: the eNB makes a switching decision, and determines the target RNC.

The eNB may determine the target RNC according to the RRC measure report, and the target RNC has an interface with the eNB;

Alternatively, when the source RNC transmits the Best Cell Indicator to the eNB, the eNB determines the target RNC according to the Best Cell Indicator.

1203: the eNB transmits to the source cell a message carrying information of the target RNC (e.g. RNC ID of the target RNC), e.g. a Handover Indication message.

If there is an Iur interface between the source RNC and the target RNC, steps 1003-1014 are performed subsequently.

1204: If there is no Iur interface between the source RNC and the target RNC, the source RNC transmits to the eNB a message for handover, e.g. a Handover Required message.

1205: the eNB transmits to the target RNC a request message for establishing an interface, e.g. a Connection Setup Request message.

1206: the target RNC decides whether to continue providing service transmission of aggregation of multiple RAT carriers for the UE.

Specifically, the target RNC may decide whether to continue providing service transmission of aggregation of multiple RAT carriers for the UE according to information of its own capability of carrier aggregation and the load of the target cell.

1207: when carrier aggregation may be continued to be used, the target RNC transmits to the eNB a corresponding response message, e.g. a Connection Setup Response message.

Establishment of the above connection between the target RNC and the eNB is initiated by the eNB. Also, similar to aforementioned embodiments, ID of the eNB may be transmitted to the target RNC, and the target RNC initiates establishment of the connection.

1208: the eNB transmits to the source RNC a message corresponding to the handover request, e.g. a Handover Request Acknowledge message.

1209: the source RNC transmits a Physical Channel Reconfiguration message to the UE.

Thereafter, the source eNB may transmit data to the target eNB (Data Forwarding).

1210: the source RNC transmits to the eNB a request message for releasing resources, e.g. a Connection Release Request message.

1211: the eNB returns a corresponding response message to the source RNC, e.g. a Connection Release Response message.

Thereafter, the Layer 1 synchronization flow may be performed between the UE, the source RNC and the target RNC (L1 Synchronization).

1212: the UE transmits a Physical Channel Reconfiguration Complete message to the target RNC.

1213: the target RNC transmits a Resource Release message to the source RNC.

In the present embodiment, the eNB transmits a connection setup request to the target RNC. When the U link switches, the target RNC may establish a connection with the eNB, thereby ensuring the continuity of the throughput of data transmission upon switching.

Figure 13:
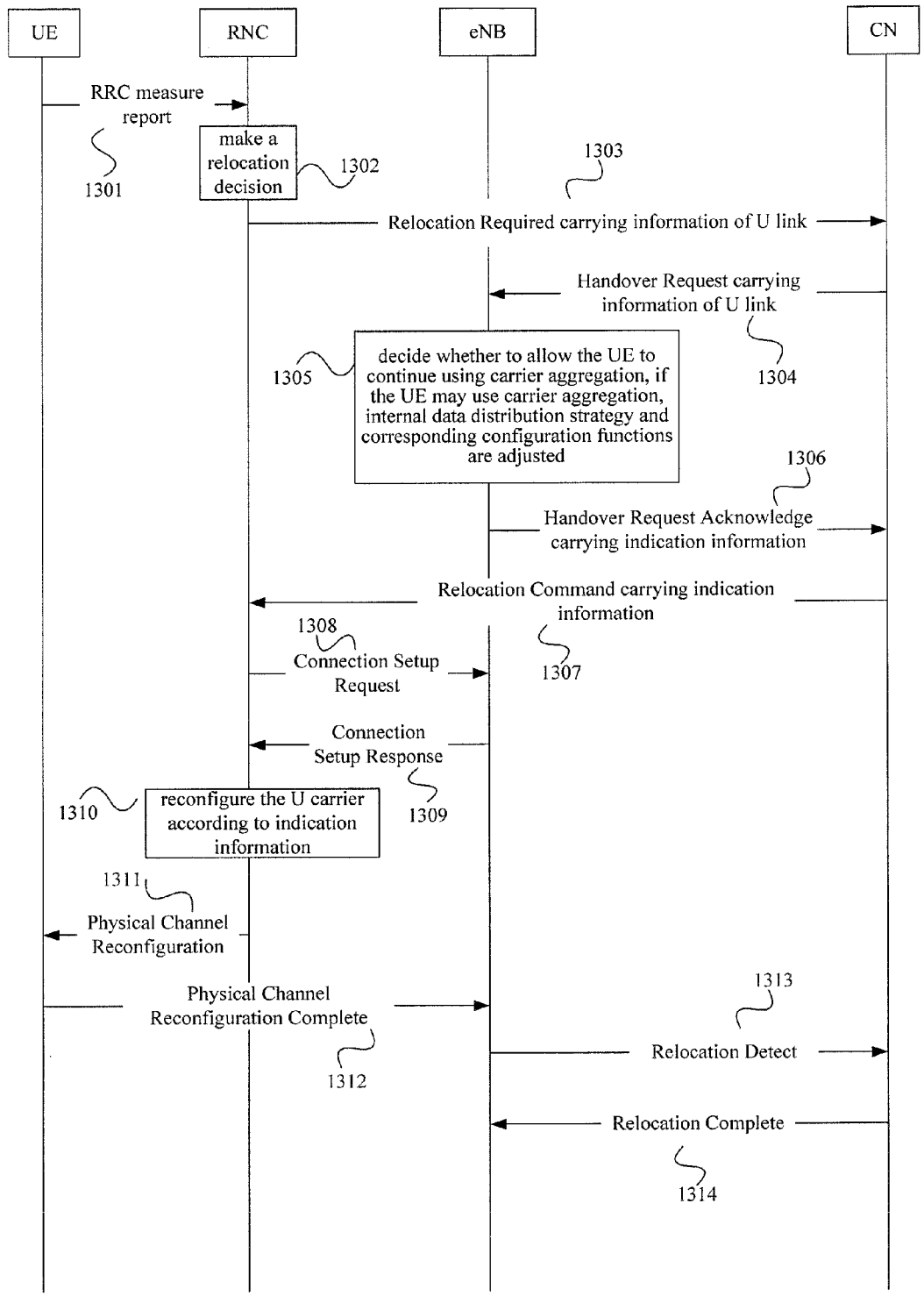
FIG. 13 is a schematic view of a flow of a method for switching of multi-carrier of another embodiment of the present invention.

FIG. 13 is a schematic view of a flow of a method for switching of multi-carrier of another embodiment of the present invention. The present embodiment relates to the scene 4, the original U link is switched to the U link and the L link, the eNB is the anchor point. Referring to FIG. 13, the switching method of multiple links of the present embodiment may be as follows.

1301: the UE transmits an RRC measure report to the RNC.

1302: the RNC makes a relocation decision, according to the capability of dual link carrier aggregation (capability of U&L Boosting) of the present RNC, whether it has an interface with the eNB.

For example, according to the signal strength in the RRC measure report, it is found that there is an LTE cell the signal of which is stronger than that of the RNC cell, and the anchor point is the eNB. At this time, the scene where the UE switches from the single U link to the UL Boosting may be achieved during the switching, and the original U link is used as the auxiliary carrier.

1303: the RNC transmits to the CN a message carrying information of the U link, e.g. a Relocation Required message carrying information of the U link, e.g. RNC ID or cell ID of the U link.

1304: the CN transmits to the eNB a message carrying information of the U link, e.g. a Handover Request message carrying information of the U link.

1305: the eNB decides whether to allow the UE to continue using carrier aggregation (U&L Boosting) according to the current load. If the UE may use the U&L Boosting, internal data distribution strategy and corresponding configuration functions are adjusted.

If the eNB is overloaded, the eNB transmits to the CN a Handover Failure message carrying a reason value: the target cell is congested. Thereafter, the CN transmits to the RNC a Relocation Preparation Failure message carrying a reason value: e.g. the target cell is congested.

1306: the eNB transmits to the CN a message carrying indication information on whether to continue using carrier aggregation, e.g. a Handover Request Acknowledge message.

1307: the CN transmits to the RNC a message carrying indication information on whether to continue using carrier aggregation, e.g. a Relocation Command message.

1308: the RNC transmits to the eNB a Connection Setup Request message.

1309: the eNB transmits to the RNC a Connection Setup Response message.

Of course, alternative steps 1308-1309 may also be: after it is decided that carrier aggregation may be continued to be used in step 1305, the eNB transmits to the RNC a Connection Setup Indication message.

1310: according to indication information on whether to continue using carrier aggregation, the RNC reconfigures the U carrier.

1311: the RNC transmit to the UE a Physical Channel Reconfiguration message.

Thereafter, the Layer 1 synchronization flow may be performed between the UE, the RNC and the eNB (L1 Synchronization and reception of NBAP: RL Restore indication).

1312: the UE transmits a Physical Channel Reconfiguration Complete message to the eNB.

1313: the eNB transmits a Relocation Detect message to the CN.

1314: the eNB transmits a Relocation Complete message to the CN

In the present embodiment, the RNC transmits information of the U link to the eNB through the core network. When the U link switches, the RNC may establish a connection with the eNB, thereby ensuring the continuity of the throughput of data transmission upon switching.

Figure 14:
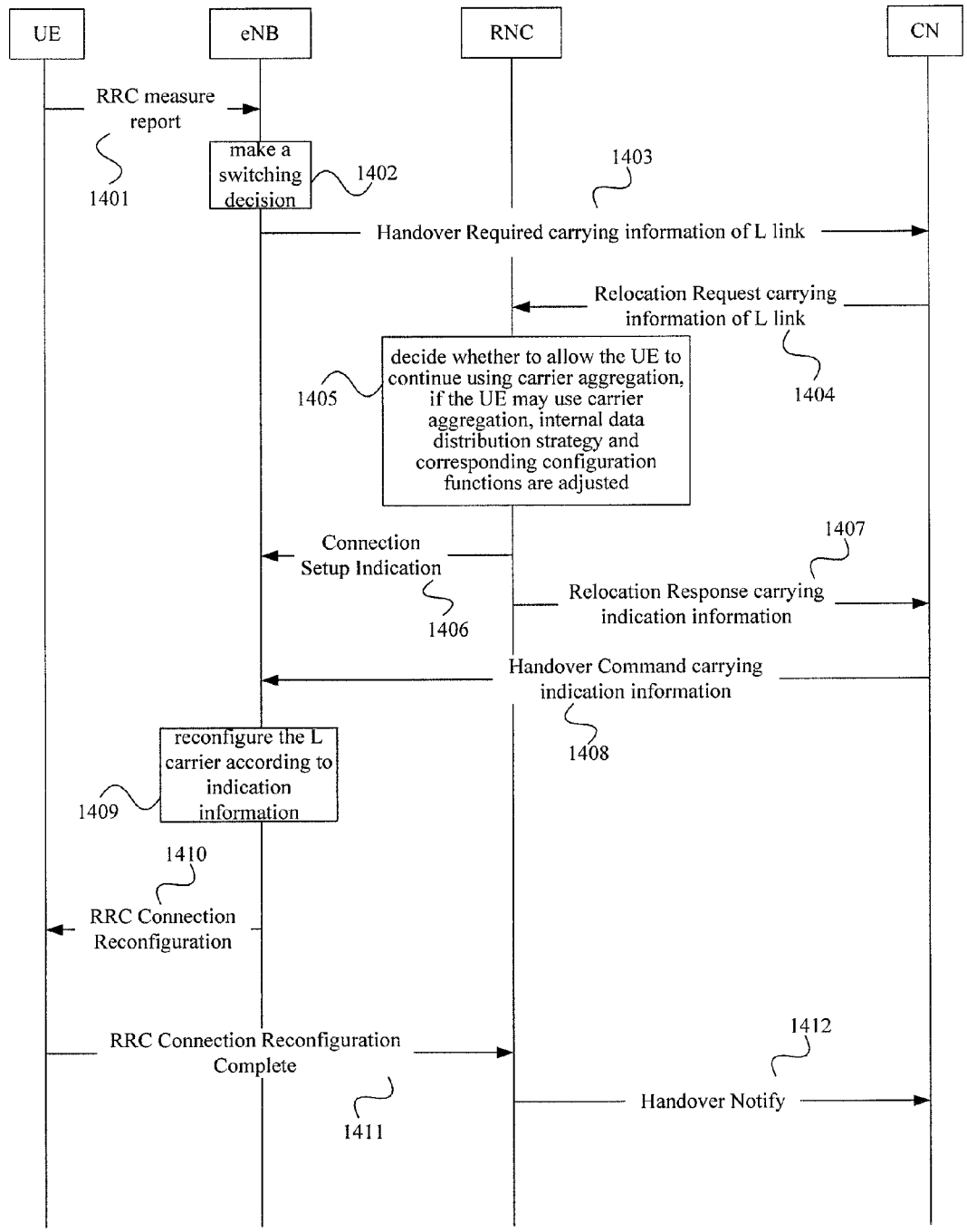
FIG. 14 is a schematic view of a flow of a method for switching of multi-carrier of another embodiment of the present invention.

FIG. 14 is a schematic view of a flow of a method for switching of multi-carrier of another embodiment of the present invention. The present embodiment relates to the scene 4, the original L link is switched to the U link and the L link, the RNC is the anchor point. Referring to FIG. 14, the switching method of multiple links of the present embodiment may be as follows.

1401: the UE transmits an RRC measure report to the eNB.

1402: the eNB makes a switching decision, according to the known RNC U&L Boosting capability, whether it has an interface with the RNC.

For example, according to the signal strength in the RRC measure report, it is found that there is an RNC cell the signal of which is stronger than that of the eNB cell. At this time, the scene where the UE switches from the single L link to the UL Boosting may be achieved during the switching, and the original L link is used as the auxiliary carrier.

1403: the eNB transmits to the CN a message carrying information of the L link, e.g. a Handover Required message carrying information of the L link, e.g. eNB ID or cell ID of the L link.

1404: the CN transmits to the RNC a message carrying information of the L link, e.g. a Relocation Request message carrying information of the U link.

1405: the RNC decides whether to allow the UE to continue using carrier aggregation (U&L Boosting) according to the current load. If the UE may use the U&L Boosting, internal data distribution strategy and corresponding configuration functions are adjusted.

If the RNC is overloaded, the RNC transmits to the CN a Relocation Failure message carrying a reason value: the target cell is congested. Thereafter, the CN transmits to the eNB a Handover Preparation Failure message carrying a reason value: e.g. the target cell is congested.

1406: if it is decided that carrier aggregation may be continued to be used, the RNC transmits to the eNB a Connection Setup Indication message.

Of course, similar to FIG. 13, the connection between the RNC and the eNB may also be established through a Connection Setup Request message and a Connection Setup Response message.

1407: the RNC transmits to the CN a message carrying indication information on whether to continue using carrier aggregation, e.g. a Relocation Response message.

1408: the CN transmits to the eNB a message carrying indication information on whether to continue using carrier aggregation, e.g. a Handover Command message.

1409: according to indication information on whether to continue using carrier aggregation, the RNC reconfigures the L carrier.

1410: the eNB transmit to the UE an RRC Connection Reconfiguration message.

Thereafter, the Layer 1 synchronization flow may be performed between the UE, the RNC and the eNB (L1 Synchronization).

1411: the UE transmits an RRC Connection Reconfiguration Complete message to the RNC.

1412: the RNC transmits a Handover Notify message to the CN.

In the present embodiment, the eNB transmits information of the L link to the RNC through the core network. When the L link switches, the RNC may establish a connection with the eNB, thereby ensuring the continuity of the throughput of data transmission upon switching.

Figure 15:
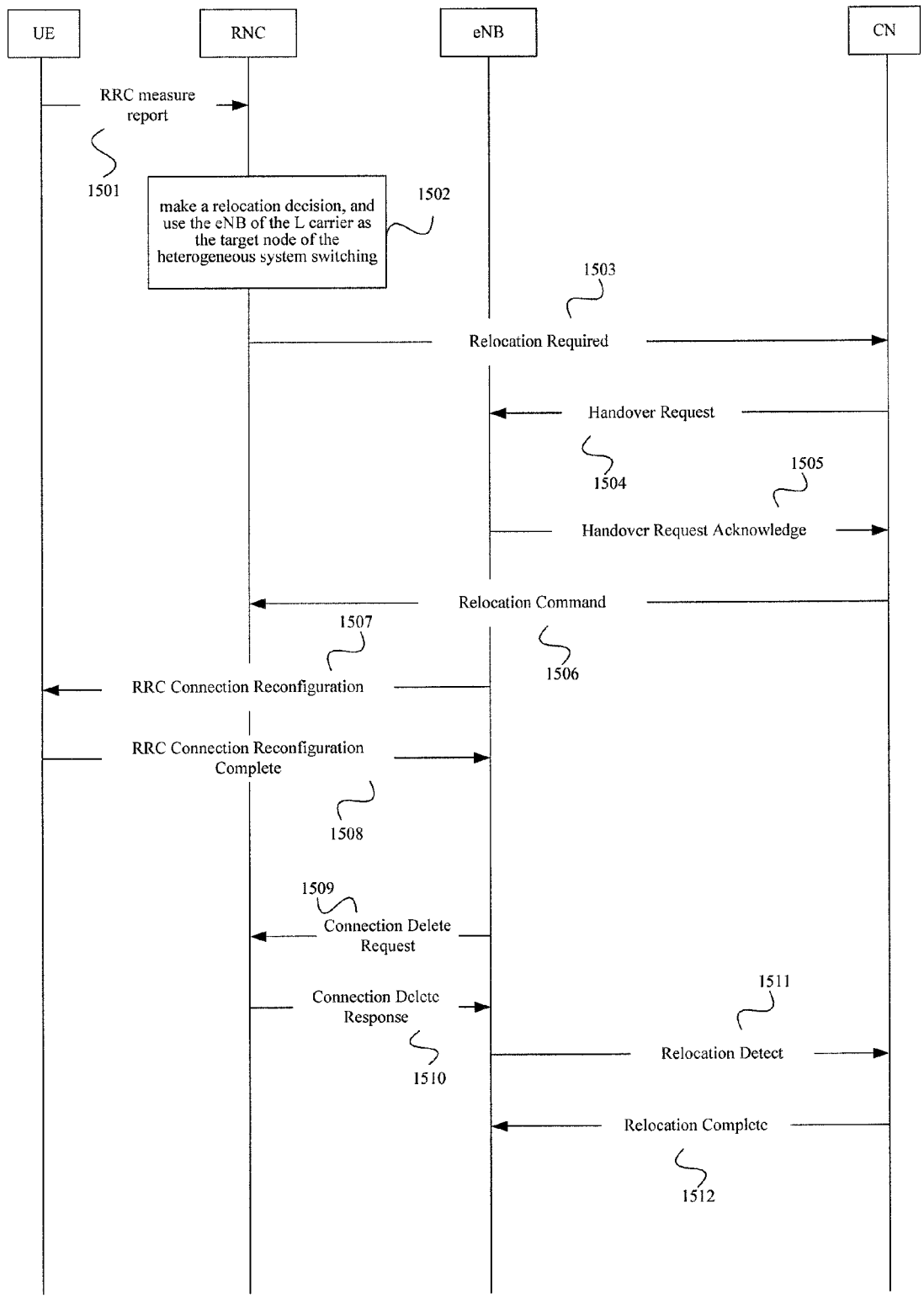
FIG. 15 is a schematic view of a flow of a method for switching of multi-carrier of another embodiment of the present invention.

FIG. 15 is a schematic view of a flow of a method for switching of multi-carrier of another embodiment of the present invention. The present embodiment relates to the scene 5, the primary link of the U link of the dual carriers is switched to the L link, is converted into single carrier transmission.

The UE originally performs data transmission under dual carriers with the RNC being the anchor point. Later, the UMTS signal becomes worse, while the L carrier signal is good, and data transmission may be done under single carrier LTE. At this time, the scene where the UE switches from the U&L Boosting dual carriers to the L single carrier may be achieved during the heterogeneous system switching process.

This process has an effect on the prior art protocol flow that the target node of the inter-RAT switching from current UMTS to the LTE needs to be set as the L carrier network control node. The empty reconfiguration process is distributed to the UE by the eNB.

Referring to FIG. 15 the switching method of multiple links of the present embodiment may be as follows. 1501: the UE transmits an RRC measure report to the RNC.

1502: the RNC makes a relocation decision, and uses the eNB of the L carrier as the target node of the heterogeneous system switching.

1503: the RNC transmits to the CN a Relocation Required message.

1504: the CN transmits to the eNB a Handover Request message.

1505: the eNB transmits to the CN a Handover Request Acknowledge message.

1506: the CN transmits to the RNC a Relocation Command message.

1507: the eNB transmit to the UE an RRC Connection Reconfiguration message.

Thereafter, the Layer 1 synchronization flow may be performed between the UE, the RNC and the eNB (L1 Synchronization and reception of NBAP: RL Restore indication).

1508: the UE transmits an RRC Connection Reconfiguration Complete message to the eNB.

1509: the eNB transmit to the RNC a Connection Delete Request message.

1510: the RNC transmit to the eNB a Connection Delete Response message.

1511: the eNB transmits a Relocation Detect message to the CN.

1512: the eNB transmits a Relocation Complete message to the CN

In the present embodiment, through the empty reconfiguring process distributed from the eNB to the UE, the primary link of the U link of the dual carriers may be switched to the L link, is converted into single carrier transmission, thereby ensuring the continuity of the throughput of service transmission.

Figure 16:
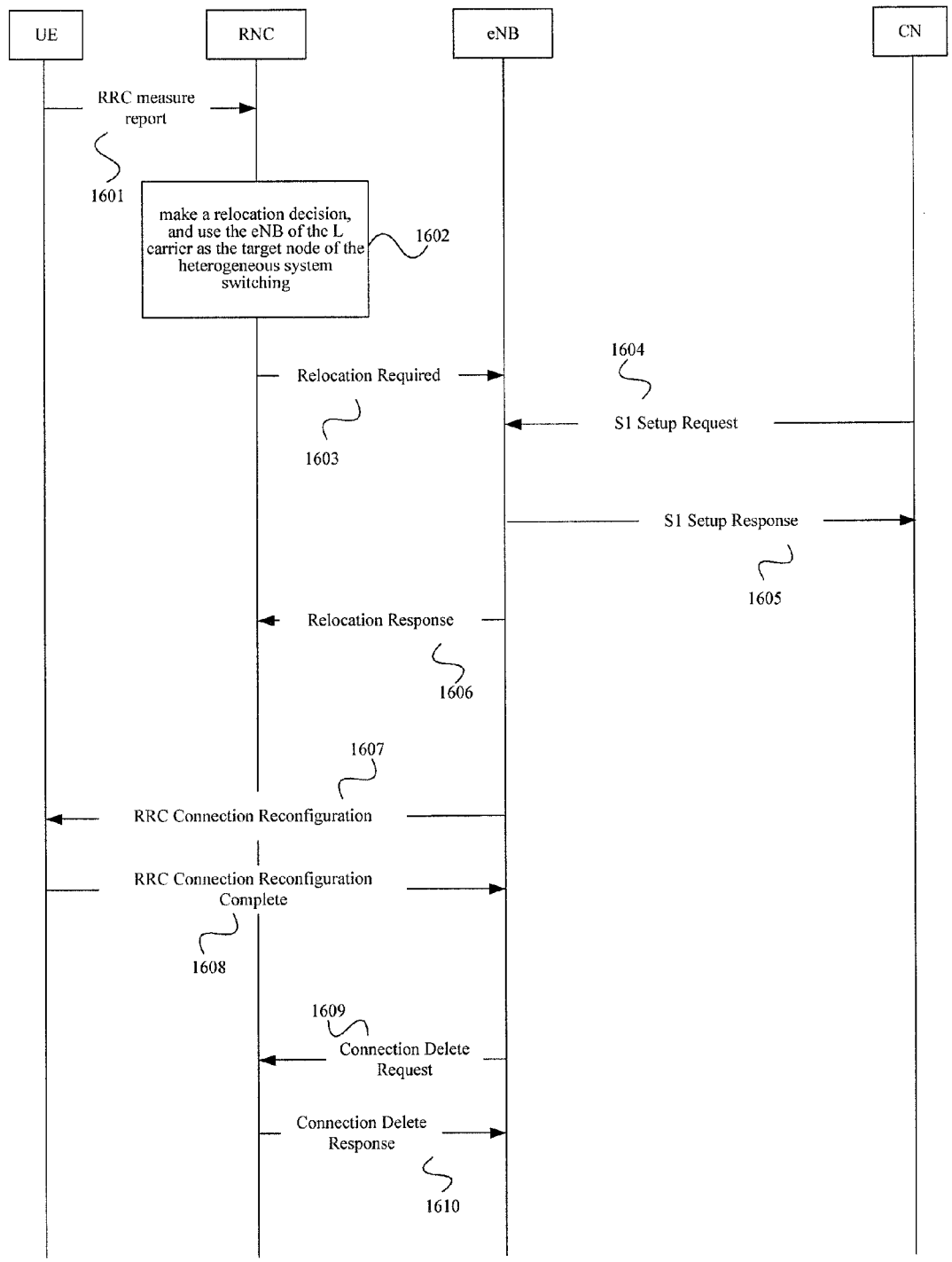
FIG. 16 is a schematic view of a flow of a method for switching of multi-carrier of another embodiment of the present invention.

FIG. 16 is a schematic view of a flow of a method for switching of multi-carrier of another embodiment of the present invention. The present embodiment relates to the scene 5, the primary link of the U link of the dual carriers is switched to the L link, is converted into single carrier transmission.

The UE originally performs data transmission under dual carriers with the RNC being the anchor point. Later, the UMTS signal becomes worse, while the L carrier signal is good, and data transmission may be done under single carrier LTE. At this time, the scene where the UE switches from the U&L Boosting dual carriers to the L single carrier may be achieved during the heterogeneous system switching process.

This process has an effect on the prior art protocol flow that the target node of the inter-RAT switching from current UMTS to the LTE needs to be set as the L carrier network control node. The empty reconfiguration process is distributed to the UE by the eNB.

Referring to FIG. 16 the switching method of multiple links of the present embodiment may be as follows.

1601: the UE transmits an RRC measure report to the RNC.

1602: the RNC makes a relocation decision, and uses the eNB of the L carrier as the target node of the heterogeneous system switching.

1603: the RNC transmits to the eNB a Relocation Required message.

1604: the eNB transmits to the CN an S1 Setup Request message.

1605: the CN transmits to the eNB an S1 Setup Response message.

1606: the eNB transmits to the RNC a Relocation Response message.

1607: the eNB transmit to the UE an RRC Connection Reconfiguration message.

Thereafter, the Layer 1 synchronization flow may be performed between the UE, the RNC and the eNB (L1 Synchronization and reception of NBAP: RL Restore indication).

1608: the UE transmits an RRC Connection Reconfiguration Complete message to the eNB.

1609: the eNB transmit to the RNC a Connection Delete Request message.

1610: the RNC transmit to the eNB a Connection Delete Response message.

In the present embodiment, through the empty reconfiguring process distributed from the eNB to the UE, the primary link of the U link of the dual carriers may be switched to the L link, is converted into single carrier transmission.

Figure 17:
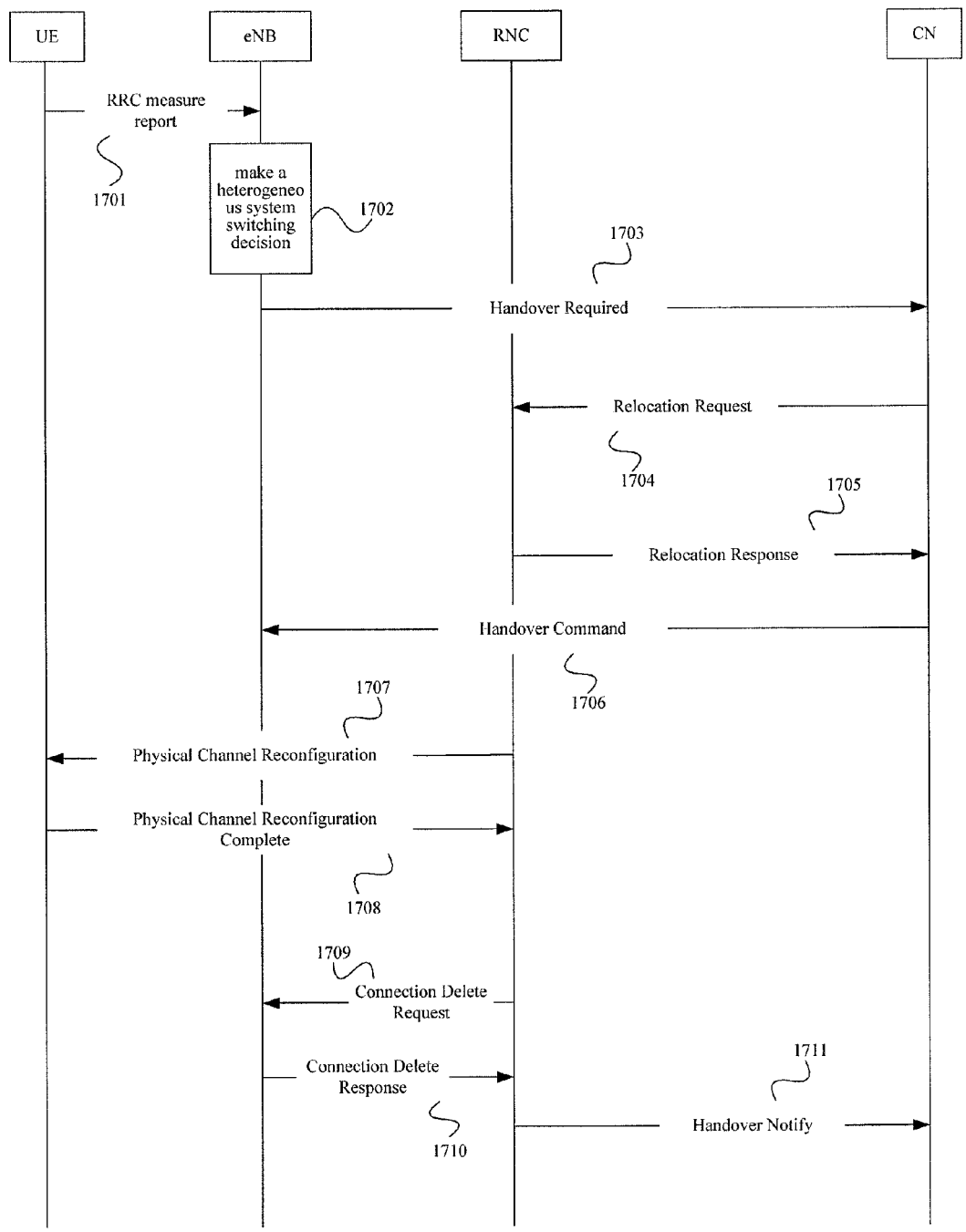
FIG. 17 is a schematic view of a flow of a method for switching of multi-carrier of another embodiment of the present invention.

FIG. 17 is a schematic view of a flow of a method for switching of multi-carrier of another embodiment of the present invention. The present embodiment relates to the scene 5, the primary link of the L link of the dual carriers is switched to the U link, is converted into single carrier transmission, thereby ensuring the continuity of the throughput of service transmission.

The UE originally performs data transmission under dual carriers with the eNB being the anchor point. Later, the LTE signal becomes worse, while the U carrier signal is good, and data transmission may be done under single carrier UMTS. At this time, the scene where the UE switches from the U&L Boosting dual carriers to the U single carrier may be achieved during the heterogeneous system switching process.

This process has an effect on the prior art protocol flow that the target node of the inter-RAT switching from current LTE to the UMTS needs to be set as the U carrier network control node. The empty reconfiguration process is distributed to the UE by the RNC.

Referring to FIG. 17 the switching method of multiple links of the present embodiment may be as follows.

1701: the UE transmits an RRC measure report to the eNB.

1702: the eNB makes a heterogeneous system switching decision.

1703: the eNB transmits to the CN a Handover Required message.

1704: the CN transmits to the RNC a Relocation Request message.

1705: the RNC transmits to the CN a Relocation Response message.

1706: the CN transmits to the eNB a Handover Command message.

1707: the RNC transmit to the UE a Physical Channel Reconfiguration message.

Thereafter, the Layer 1 synchronization flow may be performed between the UE, the RNC and the eNB (L1 Synchronization).

1708: the UE transmits a Physical Channel Reconfiguration Complete message to the RNC.

1709: the RNC transmit to the eNB a Connection Delete Request message.

1710: the eNB transmit to the RNC a Connection Delete Response message.

1711: the RNC transmits a Handover Notify message to the CN.

In the present embodiment, through the empty reconfiguring process distributed from the RNC to the UE, the primary link of the L link of the dual carriers may be switched to the U link, is converted into single carrier transmission, thereby ensuring the continuity of the throughput of service transmission.

Figure 18:
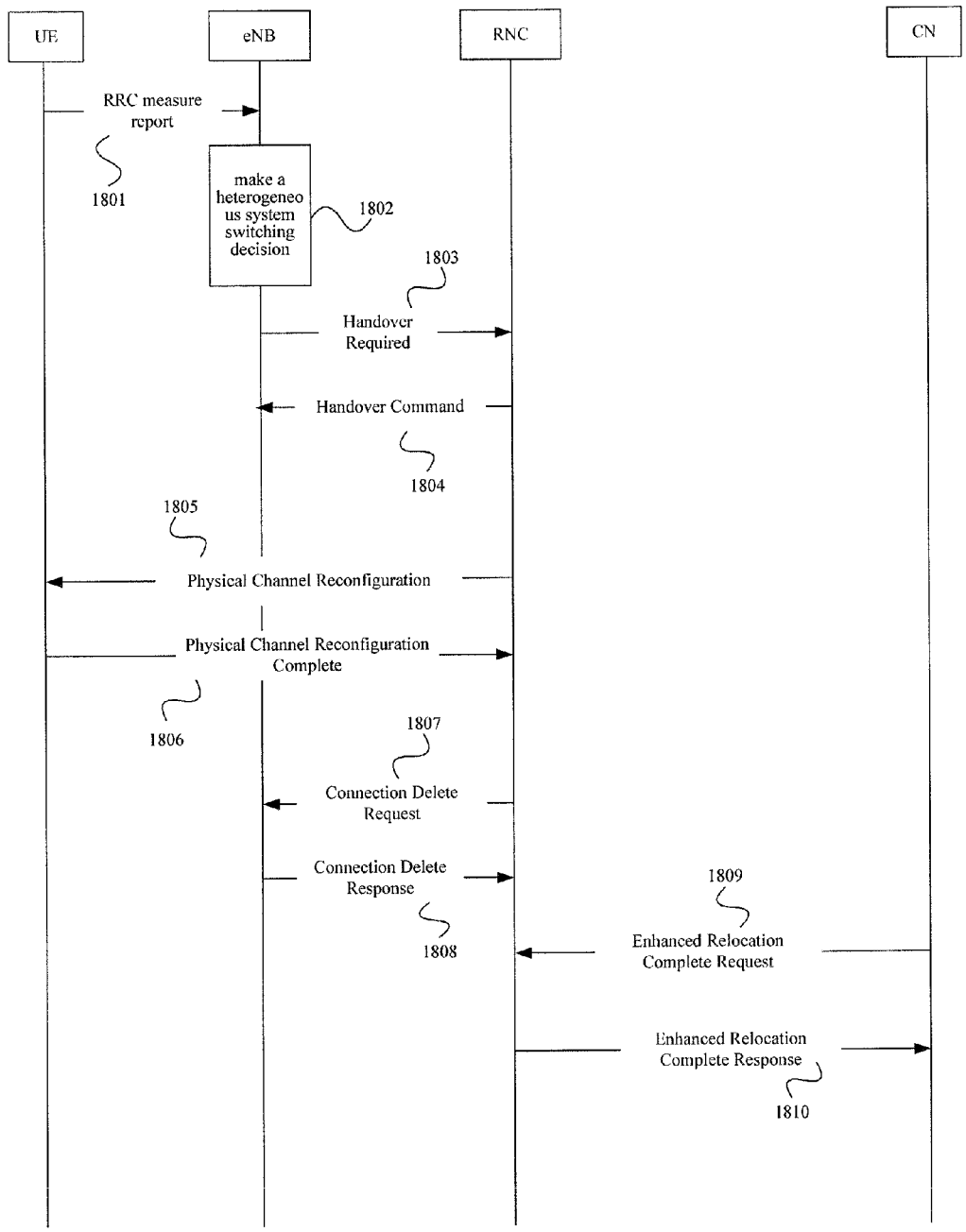
FIG. 18 is a schematic view of a flow of a method for switching of multi-carrier of another embodiment of the present invention.

FIG. 18 is a schematic view of a flow of a method for switching of multi-carrier of another embodiment of the present invention. The present embodiment relates to the scene 5, the primary link of the L link of the dual carriers is switched to the U link, is converted into single carrier transmission, thereby ensuring the continuity of the throughput of service transmission.

The UE originally performs data transmission under dual carriers with the eNB being the anchor point. Later, the LTE signal becomes worse, while the U carrier signal is good, and data transmission may be done under single carrier UMTS. At this time, the scene where the UE switches from the U&L Boosting dual carriers to the U single carrier may be achieved during the heterogeneous system switching process.

This process has an effect on the prior art protocol flow that the target node of the inter-RAT switching from current LTE to the UMTS needs to be set as the U carrier network control node. The empty reconfiguration process is distributed to the UE by the RNC.

Referring to FIG. 18 the switching method of multiple links of the present embodiment may be as follows.

1801: the UE transmits an RRC measure report to the eNB.

1802: the eNB makes a heterogeneous system switching decision.

1803: the eNB transmits to the RNC a Handover Required message.

1804: the RNC transmits to the eNB a Handover Command message.

1805: the RNC transmit to the UE a Physical Channel Reconfiguration message.

Thereafter, the Layer 1 synchronization flow may be performed between the UE, the RNC and the eNB (L1 Synchronization).

1806: the UE transmits a Physical Channel Reconfiguration Complete message to the RNC.

1807: the RNC transmit to the eNB a Connection Delete Request message.

1808: the CN transmit to the RNC a Connection Delete Response message.

1809: the CN transmits an Enhanced Relocation Complete Request message to the RNC.

1810: the RNC transmits an Enhanced Relocation Complete Response message to the CN.

In the present embodiment, through the empty reconfiguring process distributed from the RNC to the UE, the primary link of the L link of the dual carriers may be switched to the U link, is converted into single carrier transmission, thereby ensuring the continuity of the throughput of service transmission.

Figure 19:
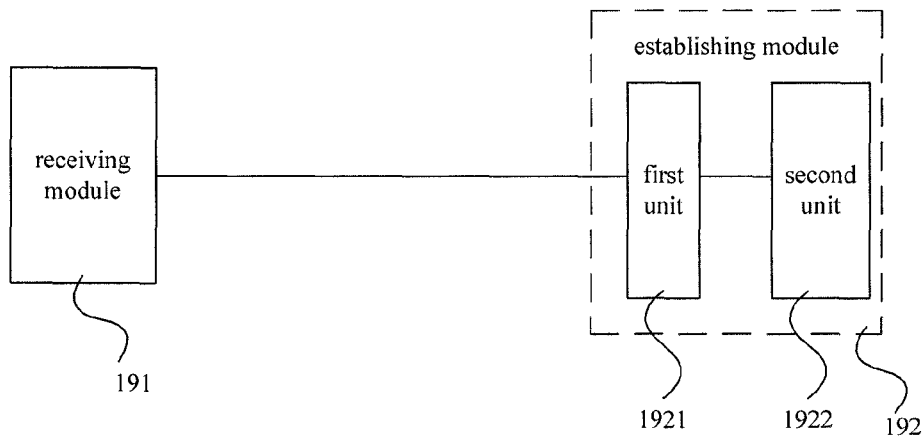
FIG. 19 is a schematic view of a structure of a multi-carrier switching device of an embodiment of the present invention.

FIG. 19 is a schematic view of a structure of a multi-carrier switching device of an embodiment of the present invention. The device comprise: a receiving module 191 configured to receive a message sent from a source RAN node corresponding to a first link and comprising information of a second link; and an establishing module 192 configured to, according to the information of the second link, establish a connection between a target RAN node corresponding to the first link and an RAN node corresponding to the second link, so as to perform data transmission, wherein the first link is a link in a first RAT network and the second link is a link in a second RAT network.

Specifically, the receiving module 191 may be specifically configured to: through a core network and an Iu interface, the target RNC receives a message sent from the source RNC and comprising information of the LTE link; or through an Iur interface, the target RNC receives a message sent from the source RNC and comprising information of the LTE link; or through an X2 interface, the target eNB receives a message sent from the source eNB and comprising information of the UMTS link; or through an S1 interface and the core network, the target eNB receives a message sent from the source eNB and comprising information of the UMTS link; or through an Iur-g interface between BSCs, the target BSC receives a message sent from the source BSC and comprising information of the LTE link; or through the core network and an A/Gb interface between the core network and the BSC, the target BSC receives a message sent from the source BSC and comprising information of the LTE link.

The establishing module 192 may be specifically configured to: according to information of the second link, information of aggregation capability of multiple RAT carriers, the interface information with the RAN node corresponding to the second link, and current load, establish a connection with the RAN node corresponding to the second link. Further, the establishing module 192 comprises: a first unit 1921 configured to transmit a Connection Setup Request message to the RAN node corresponding to the second link; and a second unit 1922 configured to receive a Connection Setup Response message returned from the RAN node corresponding to the second link. Alternatively, the establishing module 192 is specifically configured to transmit a Connection Setup Indication message to the RAN node corresponding to the second link to establish a connection directly.

The apparatus of the present embodiment may further comprise a first transmitting module configured to transmit a Handover Request Acknowledge message to the source RAN node, the Handover Request Acknowledge message containing indication information on whether to continue using aggregation of multiple RAT carriers.

It may further comprise a second transmitting module configured to transmit a Failure message to the source RAN node, the Failure message carrying a failure reason value, the failure reason value comprising: the target RAN node not supporting aggregation of multiple RAT carriers, the target RAN node having no interface information with the RAN node corresponding to the second link, or resources being insufficient. It may further comprise a third transmitting module configured to transmit a Handover Request Acknowledge message to the source RAN node.

In the present embodiment, by establishing a connection of the target RAN node corresponding to the first link with the RAN node corresponding to the second link, when the first link performs intra-system switching, the target RAN node of the first link and the RAN node of the second link may transmit multiple RAT aggregation data normally, thereby ensuring the continuity of the throughput of service transmission.

Figure 20:
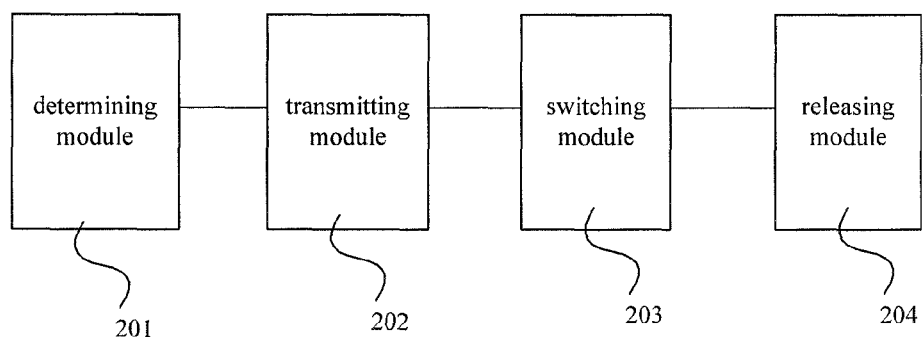
FIG. 20 is a schematic view of a structure of a multi-carrier switching device of another embodiment of the present invention.

FIG. 20 is a schematic view of a structure of a multi-carrier switching device of another embodiment of the present invention. In the present embodiment, an RAN node corresponding to a second link is an anchor point for performing carrier data division/aggregation control, an RAN node corresponding to a first link is an RAN node of an auxiliary link, the device is located at the anchor point. The device comprises: a determining module 201 configured to determine an RAN node of a target auxiliary link corresponding to a first link; and a transmitting module 202 configured to transmit information of the RAN node of the target auxiliary link to an RAN node of a source auxiliary link corresponding to the first link to establish a connection with the RAN of the target auxiliary link through the RAN node of the source auxiliary link.

Specifically, the determining module 201 may be specifically configured to: determine the RAN node of the target auxiliary link according to an RRC measure report transmitted from the UE; otherwise, determine the RAN node of the target auxiliary link according to a Best Cell Indicator sent from the RAN node of the source auxiliary link.

Further, the device of the present embodiment may also comprise a switching module 203 configured to: receive a Handover Request message transmitted from the RAN node of the source auxiliary link; transmit a Connection Setup Request message to the RAN node of the target auxiliary link; receive a Connection Setup Response message transmitted from the RAN node of the target auxiliary link; and transmit a Handover Request Acknowledge message to the RAN node of the source auxiliary link.

In the present embodiment, it may further comprise a releasing module 204 configured to receive a Connection Release Request message transmitted from the RAN node of the source auxiliary link; and transmit a Connection Release Response message to the RAN node of the source auxiliary link.

In the present embodiment, by establishing a connection of the target RAN node corresponding to the first link with the RAN node corresponding to the second link, when the first link performs intra-system switching, the target RAN node of the first link and the RAN node of the second link may transmit multiple RAT aggregation data normally, thereby ensuring the continuity of the throughput of service transmission.

Figure 21:
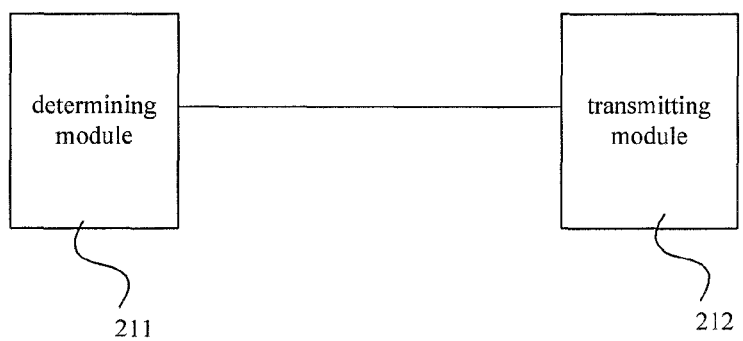
FIG. 21 is a schematic view of a structure of a multi-carrier switching device of another embodiment of the present invention.

FIG. 21 is a schematic view of a structure of a multi-carrier switching device of another embodiment of the present invention. The device may be located at a source RAN node of a first link. The device of the present embodiment comprises: a determining module 211 configured to determine an RAN node that can continue using aggregation of multiple RAT carriers as the target RAN node of the first link; and a transmitting module 212 configured to transmits a message carrying information of a second link to the target RAN node of the first link, so that data transmission is performed after the target RAN node corresponding to the first link establishes a connection with the RAN node corresponding to the second link.

The determining module 211 is specifically configured to determine an RAN node of the first link that has an aggregation capability of multiple RAT carriers and has an interface with the RAN node of the second link as the target RAN node of the first link.

In the present embodiment, it may further comprise a receiving module configured to receive a Handover Response message returned from the target RAN node of the first link according to current load.

In the present embodiment, by establishing a connection of the target RAN node corresponding to the first link with the RAN node corresponding to the second link, when the first link performs intra-system switching, the target RAN node of the first link and the RAN node of the second link may transmit multiple RAT aggregation data normally, thereby ensuring the continuity of the throughput of service transmission.

Those skilled in the art may clearly understand that for convenience and brevity of description, specific work flows of the above mentioned systems, devices and units may refer to corresponding processes in aforementioned method embodiments, and will not be described redundantly here.

In several embodiments provided in the present application, it may be understood that disclosed systems, devices and methods may be implemented in other manners. For example, the above described device embodiments are merely exemplary. For example, the division of units is merely a kind of division of logical functions. When implemented in practice, there may be additional division methods. For example, a plurality of units or components may be combined or integrated into another system, or some features may be omitted or not executed. Further, coupling or direct coupling or communication connection shown or discussed may be indirect coupling or communication connection via some interfaces, devices or units, and may be in electrical, mechanical or other forms.

Units illustrated as separate components may be or also may not be separate physically. Components shown as units may be or also may not be physical units, i.e. they may be located at one place, or may also be distributed over a plurality of networked units. According to actual needs, a part of or all of these units may be selected to achieve goals of solutions of the present embodiment.

Additionally, various functional units in various embodiments of the present invention may be integrated into one processing unit, may also be various units that exist individually. Also, two or more than two units may be integrated into one unit. The above mentioned integrated unit may be implemented in a hardware form, and may also be implemented in a software functional unit form.

If the integrated unit is implemented in a software functional unit form and is sold and used as an independent product, it may be stored in a computer readable storage medium. Based on such understanding, technical solutions of the present invention may be essentially embodied in a software product form, or the part that contributes to the prior art may be embodied in a software product form. The computer software product is stored in a storage medium, and comprises a number of instructions to cause a computer apparatus (which may be a personal computer, a server, or a network apparatus, etc) to execute all or a part of steps in methods of various embodiments of the present invention. The aforementioned storage media comprise various media that may store program codes, e.g. a U disk, a removable hard disk, a Read-Only Memory (ROM), a Random Access Memory (RAM), a magnetic disk, or an optical disk, etc.

Finally, it is noted that the above embodiments are merely used for illustrating technical solutions of the present invention and is not intended to limit them; although the present invention has been described in detail with reference to aforementioned embodiments, those ordinary skilled in the art should understand that they may still make modifications to technical solutions recorded in aforementioned various embodiments, or make equivalent substitutions for a part of technical features therein; and these modifications or substitutions do not make the essence of corresponding technical solutions depart from the spirit and scope of technical solutions of various embodiments of the present invention.

What is claimed is:

1. A method for switching of multi-carrier, comprising:
    receiving, by a target radio access network (RAN) node of a first link, a message sent from a source RAN node of the first link and comprising information of a second link; and
    establishing, by the target RAN node of the first link, a connection with a RAN node of the second link according to the information of the second link, so as to transmit data;
    wherein the first link is in a first radio access technology (RAT) network, and the second link is in a second RAT network, and
    wherein the switching is performed from the source RAN node to the target RAN node, and the source RAN node and the target RAN node belong to the same link, and wherein the first link and the second link are of different radio access technologies, and the source RAN node and the target RAN node are different RAN nodes.

2. The method according to claim 1, wherein the receiving the message sent from the source RAN node of the first link and comprising the information of the second link comprises any one of group consisting of:
    receiving, by a target radio network controller (RNC), the message sent from a source RNC and comprising information of a long term evolution (LTE) link through a core network and an Iu interface;
    receiving, by the target radio network controller (RNC), the message sent from a source RNC and comprising the information of the long term evolution (LTE) link through an Iur interface;
    receiving, by a target evolved NodeB (eNB), the message sent from a source eNB and comprising information of a universal mobile telecommunications system (UMTS) link through an X2 interface;
    receiving, by the target eNB, the message sent from the source eNB and comprising the information of the universal mobile telecommunications system (UMTS) link through an S1 interface and the core network;
    receiving, by a target base station controller (BSC), the message sent from a source BSC and comprising the information of the long term evolution (LTE) link through an Iur-g interface between BSCs; and
    receiving, by the target base station controller (BSC), the message sent from the source BSC and comprising the information of the long term evolution (LTE) link through the core network and an A/Gb interface between the core network and a BSC.

3. The method according to claim 1, wherein the establishing, by the target RAN node of the first link, the connection with the RAN node of the second link according to the information of the second link comprises:
    establishing, by the target RAN node, the connection with the RAN node of the second link according to the information of the second link, information of aggregation capability of multiple RAT carriers, interface information with the RAN node of the second link, and current load.

4. The method according to claim 3, wherein the establishing the connection with the RAN node of the second link comprises one of group consisting of:
    (a) transmitting a connection setup request message to the RAN node of the second link; and receiving a connection setup response message returned from the RAN node of the second link; and
    (b) transmitting a connection setup indication message to the RAN node of the second link to establish the connection directly.

5. The method according to claim 4, further comprising one of group consisting of:
    transmitting, by the target RAN node, a handover request acknowledge message to the source RAN node, wherein the handover request acknowledge message contains indication information on whether to continue using aggregation of the multiple RAT carriers; and
    transmitting, by the target RAN node, the handover request acknowledge message to the source RAN node.

6. The method according to claim 5, wherein when the indication information indicates that the aggregation of the multiple RAT carriers should not be continued to be used, a reason value is carried, and the reason value comprises any one of: (a) the target RAN node not supporting the aggregation of the multiple RAT carriers, (b) no an interface exists between the target RAN node and the RAN node of the second link, and (c) resources being insufficient.

7. The method according to claim 6, further comprising:
    transmitting, by the source RAN node, a connection release request to the RAN node of the second link; and
    receiving, by the source RAN node, a connection release response returned from the RAN node of the second link.

8. The method according to claim 1, wherein
    the RAN node of the first link is one of an anchor point for performing carrier data division/aggregation control and an RAN node of an auxiliary link, and the RAN node of the second link is the other one of the anchor point for performing carrier data division/aggregation control and the RAN node of the auxiliary link, which is different from the RAN node of the first link.

9. The method according to claim 1, further comprising:
    receiving, by a target RAN node of the second link, information of the target RAN of the first link transmitted from the source RAN node of the first link; and
    establishing, by the target RAN node of the second link, a connection with the target RAN of the first link to perform data transmission according to the information of the target RAN of the first link.

10. A method for switching of multi-carrier, wherein a second radio access network (RAN) node of a second link is an anchor point for performing carrier data division/aggregation control, a first RAN node of a first link is of an auxiliary link, and the method comprising:
determining, by the anchor point for performing the carrier data division/aggregation control of the second link, a target RAN node of a target auxiliary link of the first link; and
transmitting, by the anchor point, information of the target RAN node of the target auxiliary link to a source RAN node of a source auxiliary link of the first link in order to establish a connection with the target RAN through the source RAN node, and
wherein the switching is performed from the source RAN node to the target RAN node, and the source RAN node and the target RAN node belong to the same first link, and wherein the first link and the second link are of different radio access technologies, and the source RAN node and the target RAN node are different RAN nodes.

11. The method according to claim 10, wherein the information of the target RAN node comprises an identity of the target RAN node.

12. The method according to claim 10, wherein the determining the target RAN node comprises one of group consisting of:
determining, by the anchor point, the target RAN node according to a radio resource control (RRC) measure report transmitted from a user equipment (UE); and
determining, by the anchor point, the target RAN node according to a best cell indicator transmitted from the source RAN node.

13. The method according to claim 10, wherein the establishing, by the RAN node of the target auxiliary link, the connection with the anchor point comprises:
transmitting, by the target RAN node, a connection setup request message to the anchor point, and
receiving, by the target RAN node, a connection setup response message transmitted from the anchor point.

14. The method according to claim 10, further comprising:
transmitting, by the source RAN node, information of a primary link of multiple RAT carrier aggregation corresponding to the anchor point to the target RAN node, and
establishing, by the target RAN node, the connection with the anchor point.

15. The method according to claim 10, further comprising:
receiving, by the anchor point, a handover request message transmitted from the RAN node of the source auxiliary link;
transmitting, by the anchor point, a connection setup request message to the RAN node of the target auxiliary link;
receiving, by the anchor point, a connection setup response message transmitted from the RAN node of the target auxiliary link; and
transmitting, by the anchor point, a handover request acknowledge message to the RAN node of the source auxiliary link.

16. The method according to claim 10, further comprising:

receiving, by the anchor point, a connection release request message transmitted from the source RAN node; and
transmitting, by the anchor point, a connection release response message to the source RAN node.

17. A method for switching of multi-carrier, comprising:
determining, by a source radio access network (RAN) node of a first link, a first RAN node that continues using aggregation of multiple radio access technology (RAT) carriers as a target RAN node of the first link; and
transmitting, by the source RAN node of the first link, a message carrying information of a second link to the target RAN node of the first link, so that data transmission is performed after a connection between the target RAN node of the first link and a second RAN node of the second link is established, and
wherein the switching is performed from the source RAN node to the target RAN node, and the source RAN node and the target RAN node belong to the same link, and wherein the first link and the second link are of different radio access technologies, and the source RAN node and the target RAN node are different RAN nodes.

18. The method according to claim 17, wherein the determining the first RAN node that continues using the aggregation of the multiple RAT carriers as the target RAN node of the first link comprising:
determining the first RAN node of the first link that has an aggregation capability of the multiple RAT carriers and has an interface with the second RAN node of the second link as the target RAN node of the first link.

19. The method according to claim 17, further comprising:
receiving, by the source RAN node of the first link, a handover response message returned from the target RAN node of the first link according to a current load.

20. The method according to claim 17, wherein the establishing, by the target RAN node of the first link, the connection with the RAN node of the second link comprising:
transmitting, by the target RAN node of the first link, a connection setup indication message to the RAN node of the second link in order to establish the connection directly.

21. A multi-carrier switching device, comprising:
a receiver configured to receive a message sent from a source radio access network (RAN) node of a first link and comprising information of a second link; and
a processor configured to establish a connection between a target RAN node of the first link and an RAN node of the second link according to the information of the second link, so as to perform data transmission;
wherein the first link is in a first radio access technology (RAT) network, and the second link is in a second RAT network, and
wherein the switching is performed from the source RAN node to the target RAN node, and the source RAN node and the target RAN node belong to the same link, and wherein the first link and the second link are of different radio access technologies, and the source RAN node and the target RAN node are different RAN nodes.

22. The device according to claim 21, wherein the receiver is configured to implement at least one step of group consisting of:

receiving a message sent from a source radio network controller (RNC) and comprising information of a long term evolution (LTE) link through a core network and an Iu interface;

receiving the message sent from the source RNC and comprising the information of the LTE link through an Iu interface;

receiving a message sent from a source evolved NodeB (eNB) and comprising information of a universal mobile telecommunications system (UMTS) link through an X2 interface;

receiving the message sent from the source eNB and comprising the information of the universal mobile telecommunications system (UMTS) link through an S1 interface and the core network;

receiving a message sent from a source base station controller (BSC) and comprising the information of the long term evolution (LTE) link through an Iur-g interface between BSCs; and receiving the message sent from the source BSC and comprising the information of the long term evolution (LTE) link through the core network and an A/Gb interface between the core network and a BSC.

23. The device according to claim 21, wherein the processor is configured to:
establish the connection with the RAN node of the second link according to the information of the second link, information of aggregation capability of multiple RAT carriers, interface information with the RAN node of the second link, and a current load.

24. The device according to claim 23, further comprising:
a transmitter, configured to transmit a connection setup request message to the RAN node of the second link;
wherein the receiver is further configured to receive a connection setup response message returned from the RAN node of the second link.

25. The device according to claim 23, further comprising:
a transmitter configured to transmit a connection setup indication message to the RAN node of the second link in order to establish the connection directly.

26. The device according to claim 21, further comprising a transmitter configured to implement at least one step of group consisting of:
transmitting a handover request acknowledge message to the source RAN node, wherein the handover request acknowledge message contains indication information on whether to continue using aggregation of multiple RAT carriers;
transmitting a failure message to the source RAN node, wherein the failure message carries a failure reason value, and the failure reason value comprises at least one of: the target RAN node not supporting aggregation of multiple RAT carriers, no interface exists between the target RAN node and the RAN node of the second link, and resources being insufficient; and
transmitting the handover request acknowledge message to the source RAN node.

27. A multi-carrier switching device, wherein a second radio access network (RAN) node of a second link is an anchor point for performing carrier data division/aggregation control, a first RAN node of a first link is of an auxiliary link, the device is located at the anchor point, and the device comprises:
a processor configured to determine a target RAN node of a target auxiliary link of the first link; and
a transmitter configured to transmit information of the target RAN node to a source RAN node of the first link in order to establish a connection with the target RAN node through the source RAN node, and
wherein the switching is performed from the source RAN node to the target RAN node, and the source RAN node and the target RAN node belong to the same first link, and wherein the first link and the second link are of different radio access technologies, and the source RAN node and the target RAN node are different RAN nodes.

28. The device according to claim 27, wherein the processor is configured to implement one of group consisting of:
determining the RAN node of the target auxiliary link according to a radio resource control (RRC) measure report transmitted from a user equipment (UE); and
determining the RAN node of the target auxiliary link according to a best cell indicator transmitted from the RAN node of the source auxiliary link.

29. The device according to claim 27, further comprising:
a receiver configured to receive a handover request message transmitted from the source RAN node;
wherein the transmitter is further configured to transmit a connection setup request message to the target RAN node; the receiver is further configured to receive a connection setup response message transmitted from the target RAN node; and the transmitter is further configured to transmit a handover request acknowledge message to the source RAN node.

30. The device according to claim 27, further comprising:
a receiver configured to receive a connection release request message transmitted from the source RAN node;
wherein the transmitter is further configured to transmit a connection release response message to the source RAN node.

31. A multi-carrier switching device, comprising:
a processor configured to determine a radio access network (RAN) node that continues using aggregation of multiple radio access technology (RAT) carriers as a target RAN node of a first link; and
a transmitter configured to transmit a message carrying information of a second link to the target RAN node of the first link, so that data transmission is performed after a connection between the target RAN node of the first link and a RAN node of the second link is established, and
wherein a switching is performed from a source RAN node to the target RAN node, and the source RAN node and the target RAN node belong to the same link, and wherein the first link and the second link are of different radio access technologies, and the source RAN node and the target RAN node are different RAN nodes.

32. The device according to claim 31, wherein the processor is configured to determine an RAN node of the first link that has an aggregation capability of multiple RAT carriers and has an interface with the RAN node of the second link as the target RAN node of the first link.

33. The device according to claim 31, further comprising:
a receiver configured to receive a handover response message returned from the target RAN node of the first link according to a current load.

* * * * *